United States Patent
Kim et al.

(10) Patent No.: US 9,208,029 B2
(45) Date of Patent: Dec. 8, 2015

(54) COMPUTER SYSTEM TO SWITCH LOGICAL GROUP OF VIRTUAL COMPUTERS

(75) Inventors: Sungho Kim, Sagamihara (JP); Eiji Nishijima, Yokohama (JP)

(73) Assignee: HITACHI, LTD., Tokyo (JP)

( * ) Notice: Subject to any disclaimer, the term of this patent is extended or adjusted under 35 U.S.C. 154(b) by 271 days.

(21) Appl. No.: 13/883,583

(22) PCT Filed: Nov. 12, 2010

(86) PCT No.: PCT/JP2010/006654
§ 371 (c)(1),
(2), (4) Date: Jul. 3, 2013

(87) PCT Pub. No.: WO2012/063294
PCT Pub. Date: May 18, 2012

(65) Prior Publication Data
US 2013/0290771 A1    Oct. 31, 2013

(51) Int. Cl.
G06F 11/14    (2006.01)
G06F 9/48    (2006.01)
G06F 11/20    (2006.01)

(52) U.S. Cl.
CPC ............ *G06F 11/1415* (2013.01); *G06F 9/485* (2013.01); *G06F 11/1438* (2013.01); *G06F 11/1484* (2013.01); *G06F 11/2023* (2013.01)

(58) Field of Classification Search
CPC ............ G06F 11/1415; G06F 11/1438; G06F 11/1484; G06F 11/2023; G06F 11/00; G06F 11/203; G06F 11/2025; G06F 11/2038; G06F 9/485; G06F 9/45533; G06F 9/45558; G06F 8/63
See application file for complete search history.

(56) References Cited

U.S. PATENT DOCUMENTS

| | | | |
|---|---|---|---|
| 7,788,524 B2* | 8/2010 | Wing et al. | 714/4.1 |
| 7,992,143 B2* | 8/2011 | Janzen | 717/174 |
| 8,015,562 B2* | 9/2011 | Bertolotti et al. | 718/1 |
| 8,156,253 B2* | 4/2012 | Watanabe | 710/8 |
| 8,364,802 B1* | 1/2013 | Keagy et al. | 709/223 |
| 8,458,717 B1* | 6/2013 | Keagy et al. | 718/104 |
| 8,468,533 B2* | 6/2013 | Miyazaki et al. | 718/103 |
| 8,656,018 B1* | 2/2014 | Keagy et al. | 709/226 |
| 8,970,603 B2* | 3/2015 | Post et al. | 345/501 |
| 2005/0268298 A1* | 12/2005 | Hunt et al. | 718/1 |
| 2008/0263390 A1* | 10/2008 | Baba et al. | 714/4 |
| 2009/0300599 A1* | 12/2009 | Piotrowski | 717/174 |
| 2012/0084774 A1* | 4/2012 | Post et al. | 718/1 |

FOREIGN PATENT DOCUMENTS

| | | |
|---|---|---|
| JP | 2005-327279 A | 11/2005 |
| JP | 2008-269332 A | 11/2008 |
| JP | 2009-187090 A | 8/2009 |
| JP | 2009-211517 A | 9/2009 |

* cited by examiner

Primary Examiner — Nadeem Iqbal
(74) *Attorney, Agent, or Firm* — Mattingly & Malur, PC

(57) ABSTRACT

A computer system has a plurality of computer nodes, and each computer node has a plurality of virtual computers and a control base unit controlling the virtual computers. Each virtual computer constitutes a multiplexing group with another virtual computer operating on another computer node different from its own computer node, with one operating as the master and the other as the slave. The control base unit controls whether each virtual computer is operating as either the master or the slave, and monitors the respective states of each virtual computer. The control base unit, when it has detected in its own node a failure of the virtual computer operating as the master virtual computer, makes a decision whether to also switch the other virtual computers operating on its own computer node from master virtual computers to slave virtual computers with the virtual computer in which the failure occurred.

12 Claims, 17 Drawing Sheets

FIG. 3

COMPUTER NODE STRUCTURE MNG TABLE 301

| COMPUTER NODE ID (311) | MASTER/ SLAVE STATE FLAG (312) | MULTICAST ADDRESS (313) | ALIVE/DEAD STATE FLAG (314) | MONITORING PERIOD[ms] (315) | ALIVE/DEAD DEFINITE COUNTER (316) |
|---|---|---|---|---|---|
| 100-A | M | 226.94.1.1 | 0 | 1000 | 3 |
| 100-B | S | 226.94.1.1 | 0 | 1000 | 3 |

FIG. 4

VM STATE MNG TABLE 302

| TOTAL NUMBER OF MANAGED VM'S (321) | 3 | TOTAL NUMBER OF FAILED VM'S (322) | 0 | | 327 |
|---|---|---|---|---|---|
| VM ID (323, 328) | HOST COMPUTER NODE ID (324) | MASTER/ SLAVE STATE FLAG (325) | ALIVE/DEAD STATE FLAG (326) | MASTER/SLAVE STRUCTURE VM INFORMATION | |
| | | | | HOST COMPUTER NODE ID (327-A) | VM ID (327-B) |
| VM1 | 100-A | M | 0 | 100-B | VM4 |
| VM2 | 100-A | M | 0 | 100-B | VM5 |
| VM3 | 100-A | M | 0 | 100-B | VM6 |

FIG. 5

RESOURCE MNG TABLE 303

| VM ID 331 | RESOURCE ID 332 (211) | MONITORING PERIOD[ms] 333 | RESOURCE ALIVE/DEAD STATE FLAG 334 | RESOURCEDE DETAILED INFORMATION 335 POSSESSION STATE 335-A | INDIVIDUAL INFORMATION 335-B |
|---|---|---|---|---|---|
| VM1 | AP1 | 100 | 0 | OCCUPIED | 212 |
| VM1 | 101-A | 0 | 0 | OCCUPIED | EVT |
| VM1 | 101-B | 0 | 0 | SHARED | EVT |
| VM1 | 104-A | 50 | 0 | SHARED | 212 |
| VM1 | VM2 | 100 | 0 | LOGICAL/SERVER | 212 |
| VM2 | AP2 | 100 | 0 | OCCUPIED | 212 |
| VM2 | 101-C | 0 | 0 | OCCUPIED | EVT |
| VM2 | 101-B | 0 | 0 | SHARED | EVT |
| VM2 | 104-A | 50 | 0 | SHARED | 212 |
| VM2 | VM1 | 100 | 0 | LOGICAL/CLIENT | 212 |

FIG. 6

SYSTEM SWITCHING CONTROL TABLE 304

| FAILURE CONTENTS | SYSTEM SWITCHING OBJECT VM | WHETHER IT IS NECESSARY TO APPLY MAJORITY DECISION LOGIC | WHETHER IT IS POSSIBLE TO APPLY FAILBACK PROCESSING |
|---|---|---|---|
| COMPUTER NODE FAILURE | ALL VM'S | NOT | NOT |
| FAILURE OF RESOURCE OCCUPIED BY VM | ONLY PERTINENT VM | NECESSARY | POSSIBLE |
| FAILURE OF RESOURCE SHARED BY VM | ALL RELATING VM'S | NECESSARY | POSSIBLE |
| VM LOGICAL RESOURCE FAILURE | ALL RELATING VM'S | NECESSARY | POSSIBLE |

FIG. 7

EXAMPLE OF VM 1 FAILURE CONTENTS AND SYSTEM SWITCHING CONTROL CONTENTS 304

| FAILURE CONTENTS | | SYSTEM SWITCHING OBJECT VM | WHETHER IT IS NECESSARY TO APPLY MAJORITY DECISION LOGIC | WHETHER IT IS POSSIBLE TO APPLY FAILBACK PROCESSING |
|---|---|---|---|---|
| COMPUTER NODE FAILURE | | ALL VM SWITCHING | NOT | NOT |
| FAILURE OF RESOURCE OCCUPIED BY VM 1 | AP1 | VM 1 SWITCHING | NECESSARY | POSSIBLE |
| | 101-A | | | |
| FAILURE OF RESOURCE SHARED BY VM 1 | 101-B | VM 1 AND VM 2 SWITCHING | NECESSARY | POSSIBLE |
| | 104-A | | | |
| VM1 LOGICAL RESOURCE FAILURE | VM2 | VM 1 AND VM 2 SWITCHING | NECESSARY | POSSIBLE |

FIG. 8

INTER-COMPUTER-NODE COM FORMAT (500)

| COMPUTER NODE ID (501) | SEQUENCE NUMBER (502) | TRANSMISSION TIME STAMP (503) | COM KIND (504) | | | | VM STATE MNG TABLE CONTENTS (505) | RESOURCE MNG TABLE CONTENTS (506) | RESPONSE ABNORMALITY COUNT (507) |
|---|---|---|---|---|---|---|---|---|---|
| | | | ALIVE/DEAD (504-A) | SYSTEM SWITCHING | | | | | |
| | | | | FAIL BACK (504-B) | ABNORMAL VM'S (504-C) | ALL VM'S (504-D) | | | |
| 200-A | 001 | HHMMSS | | | | | 302 | 303 | 0 |

FIG. 9

INTER-PROGRAM COM FORMAT (600)

| VM ID (601) | SEQUENCE NUMBER (602) | TRANSMISSION TIME STAMP (603) | RESOURCE MNG TABLE CONTENTS (604) | SYSTEM SWITCHING REQUEST (605) |
|---|---|---|---|---|
| 323 | 001 | HHMMSS (EXAMPLE:081203) | 303 | 0 |

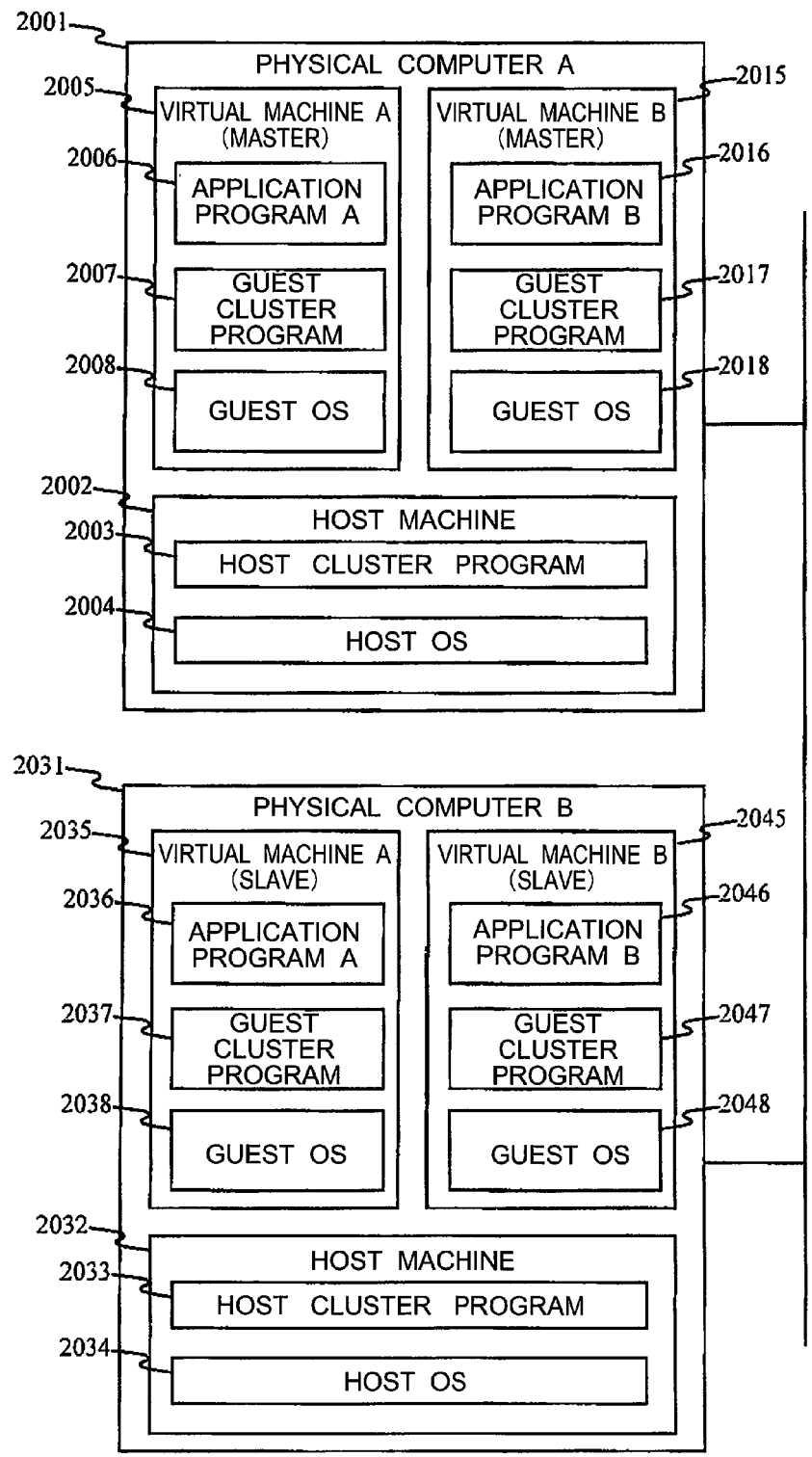

COMPUTER SYSTEM TO SWITCH LOGICAL GROUP OF VIRTUAL COMPUTERS

TECHNICAL FIELD

The present invention relates to a computer system structured by multiplexing a plurality of computer nodes in order to enhance the availability in the server virtualization environment. In particular, the present invention relates to a method for conducting failure monitoring of a host machine and virtual machines on computer nodes and system switching of the computer nodes.

BACKGROUND ART

The server virtualization technique has a merit that the operation cost, the space for installing computers, and the power dissipation can be reduced by executing a plurality of virtual machines on one physical computer and reducing the number of physical computers. In recent years, therefore, the server virtualization technique has attracted attention. In order to ensure reliability equivalent to that in a system operated in physical computers, however, not only multiplexing of physical computers which provide the virtualization environment but also a multiplexing structure of virtual machines controlled and operated in each physical computer is demanded.

A method for detecting a failure and switching a system by taking each of virtual machines on physical computers as the unit is disclosed in Patent Literature 1. According to Patent Literature 1, physical computers 2001 and 2031 are multiplexed via a LAN, the physical computer A 2001 has a host machine 2002 and a server virtualization environment including virtual machines 2005 and 2015, and the physical computer B 2031 also has a similar structure, as shown in FIG. 20. Furthermore, as a failure detection method and a system switching method, a guest cluster program 2007 is provided on the virtual machine A 2005 on the physical computer A 2001, a guest cluster program 2017 is provided on the virtual machine B 2015, and a host cluster program 2003 is provided on the host machine 2002. The physical computer B 2031 also has a similar structure.

The guest cluster programs 2007 and 2017, or 2037 and 2047 monitor operation situations of application programs 2006 and 2016, or 2036 and 2046, and give a notice of a result of the monitoring to the host cluster program 2003 or 2033. Upon receiving a system switching instruction from the host cluster program 2003, the guest cluster programs 2007 and 2017 execute system switching of a master/slave mode for their respective corresponding virtual machines 2005 and 2015. When the virtual machine is in the master mode, the application conducts processing on input data and outputs a result of the processing. On the other hand, when the virtual machine is in the slave mode, the application conducts processing on input data, but it doesn't output a processing result. Upon receiving a system switching instruction from the host cluster program 2033, the guest cluster programs 2037 and 2047 also execute system switching of a master/slave mode for their respective corresponding virtual machines 2035 and 2045 in the same way. On the other hand, the host cluster program 2003 or 2013 monitors operation situations of virtual machines operating on the same physical computer (the virtual machines 2005 and 2015 or the virtual machines 2035 and 2045). For example, upon detecting that the virtual machine A 2005 in the master mode is suspended, the host cluster program 2013 switches the virtual machine A 2035 from the slave mode to the master mode.

CITATION LIST

Patient Literature

Patent literature 1: JP-A-2008-269332

SUMMARY OF INVENTION

Technical Problem

In Patent literature 1, a failure is detected by taking a virtual machine on a physical computer as the unit, and system switching between the master and the slave is executed. For example, it is supposed in FIG. 20 that the virtual machine A 2005 on the physical computer A 2001 has a failure when both virtual machines 2005 and 2015 on the physical computer A 2001 are in the master mode and both virtual machines 2035 and 2045 are in the slave mode. In this case, the virtual machine A 2035 on the physical computer B switches from the slave mode to the master mode and operates. In this case, the physical computer A is brought into a state in which a virtual machine in the master mode and a virtual machine in the slave mode are mixedly present. The physical computer B is also brought into a state in which a virtual machine in the master mode and a virtual machine in the slave mode are mixedly present.

When it is desired to conduct hardware maintenance for a physical computer, however, the physical computer cannot be suspended temporarily unless all virtual machines on the physical computer are in the slave mode (or a suspension mode). Because the virtual machine in the master node outputs a result obtained by conducting actual processing, and consequently the virtual machine that is conducting processing cannot be suspended. In other words, there is a problem that hardware maintenance cannot be conducted in the state in which a virtual machine in the master mode and a virtual machine in the slave mode are mixedly present on a physical computer.

Therefore, a technique for effecting system switching of respective virtual machines to cause a plurality of virtual machines installed on a physical computer to be in the same operation mode as far as possible in multiplexing structure control of virtual computers is provided.

Solution to Problem

A computer system has a plurality of computer nodes, and each computer node has a plurality of virtual computers and a control base unit controlling the virtual computers. Each virtual computer constitutes a multiplexing group with another virtual computer operating on another computer node different from its own computer node, with either one operating as the master and the other operating as the slave. The control base unit controls whether each virtual computer is operating as either the master or the slave, and monitors the respective states of each virtual computer. The control base unit, when it has detected in its own node a failure of the virtual computer operating as the master virtual computer, makes a decision in accordance with predetermined rules whether to also switch the other virtual computers operating on its own computer node from master virtual computers to slave virtual computers along with the virtual computer in which the failure occurred.

Advantageous Effects of Invention

It is possible to effect system switching of respective virtual machines to cause a plurality of virtual machines installed on a physical computer to be in the same operation mode as far as possible in multiplexing structure control of virtual computers.

BRIEF DESCRIPTION OF DRAWINGS

FIG. 3 is a diagram showing a structure example of a computer node structure management table;

FIG. 4 is a diagram showing a structure example of a VM state management table;

FIG. 5 is a diagram showing a structure example of a resource management table;

FIG. 6 is a diagram showing a structure example of a system switching control table;

FIG. 7 is a diagram showing a system switching control table intended for VM1;

FIG. 8 is a diagram showing an example of a format of communication between computer nodes;

FIG. 9 is a diagram showing an example of a format of communication between multiplex control agent program and a multiplex control base program;

FIG. 20 is a diagram showing an example of a computer system.

DESCRIPTION OF EMBODIMENTS

Hereafter, embodiments will be described with reference to the drawings. By the way, the present invention is not restricted to the embodiments. All application examples conforming to thought of the present invention come under the present invention.

Embodiment 1

Figure 1:
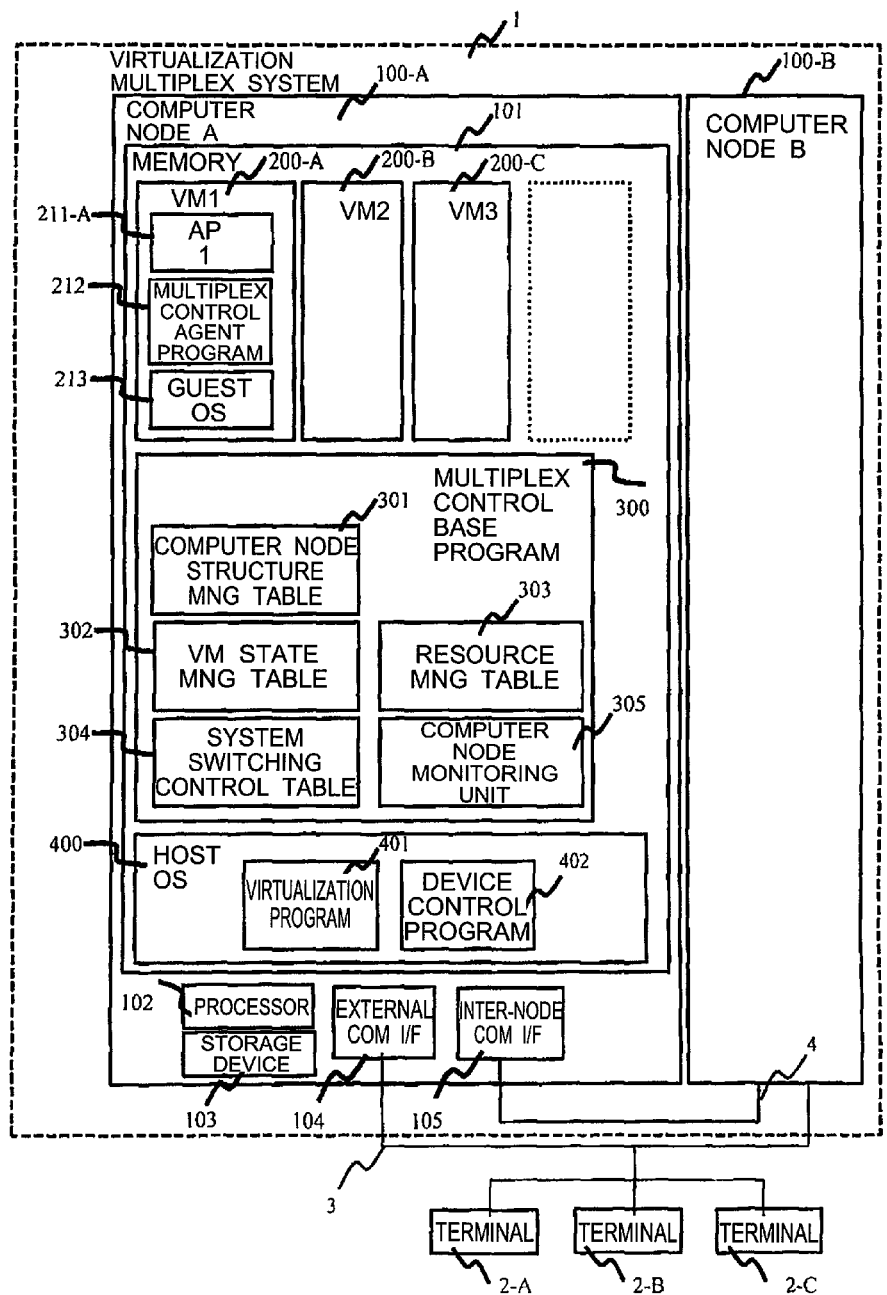
FIG. 1 is a diagram showing a structure example of a virtualization multiplex system.

<FIG. 1: General Structure Example>

FIG. 1 shows a general structure example of a virtualization multiplex system.

A virtualization multiplex system 1 is connected to one or a plurality of terminals 2 via an external network 3. The virtualization multiplex system 1 includes two computer nodes 100 (in FIG. 1, a computer node A 100-A and a computer node B 100-B) and an internal network 4.

The computer node 100 includes a memory 101, a processor 102, a storage device 103, an external communication (COM) interface 104 (in FIG. 1, interface is abbreviated to I/F), and an inter-node communication I/F 105. Both the computer node A 100-A and the computer node B 100-B have the same structure.

In the memory 101, a host operating system 400 (abbreviated to host OS in FIG. 1), a multiplex control base program 300, and one or a plurality of virtual machine environments 200 (abbreviated to VM in FIG. 1) are retained. In the host OS 400, a virtualization program 401 and a device control program 402 are retained. The multiplex control base program 300 includes a computer node structure management (MNG) table 301, a VM state management table 302, a resource management table 303, a system switching control table 304, and a computer node monitoring unit 305. The VM 200 includes an application 211 (abbreviated to AP in FIG. 1), a multiplex control agent program 212, and a guest operating system 213 (abbreviated to guest OS in FIG. 1).

By the way, an example in which three terminals 2-A, 2-B and 2-C are connected to the virtualization multiplex system 1 as the terminals 2 and VM 1 200-A, VM 2 200-B and VM 3 200-C are provided in the computer node A 100-A as the VMs 200 is shown in FIG. 1. However, the number is not especially restricted.

The computer node A 100-A and the computer node B 100-B in the virtualization multiplex system 1 are connected to each other via the internal network 4. In the computer node 100, the external network 3 is connected to the internal communication I/F 104 and the internal network 4 is connected to the inter-node communication I/F 105.

The terminal 2 transmits a request to the virtualization multiplex system 1 via the external network 3, and the virtualization multiplex system 1 returns a result obtained by conducting processing in response to the request, to the terminal 2. As for the computer node A 100-A and the computer node B 100-B in the virtualization multiplex system 1, one of them operates as a "master node" and the other operates as a "slave node." A request from the terminal 2 is received and processed by both the computer node A 100-A and the computer node B 100-B. In cases where operation is conducted in a normal state, however, only the computer node 100 that is the "master node" returns a processing result to the terminal 2. When a hindrance has occurred in continuation of processing in the master node due to a failure of the external communication I/F 104 or the like, the relation of the master node/the slave node between the computer nodes 100 is switched.

The storage device 103 in the computer node 100 stores the host OS 400, the multiplex control base program 300 (a program and various kinds of table information), and the AP 211, the multiplex control agent program 212 and the guest OS 213 included in the VM 200. The processor 102 develops the host OS 400, the multiplex control base program 300, and components of the VM 200 onto the memory 101, and executes them. Furthermore, the processor 102 conducts processing on interrupts from the external communication I/F 104 and the inter-node communication I/F 105. The external communication I/F 104 conducts data transmission and reception with the terminal 2 through the external network 3. The inter-node communication I/F 105 conducts data transmission and reception with the other computer node 100 through the internal network 4.

The virtualization program 401 is a program for generating and managing the VM 200, and the device control program 402 is a program for accessing the external communication I/F 104, the inter-node communication I/F 105, and the storage device 103. The host OS 400 controls execution of the multiplex control base program 300 and the VM 200 and controls access to the external communication I/F 104, the inter-node communication I/F 105, and the storage device 103, by using the virtualization program 401 and the device control program 402.

The VM 200 is a virtual execution environment generated by the virtualization program 401 in which a peculiar program and an operating system can operate. In cases where there are a plurality of VMs 200, programs and operating systems which operate in different VMs 200 may be the same, or may be different. Furthermore, programs and operating systems operating in different VMs 200 do not directly exert influence on each other. The VM 200 has a unique identifier (ID) in the virtualization multiplex system 1. For example, the VMs 200 in FIG. 1 have identifiers "VM1," "VM2" and "VM3." Furthermore, an arbitrary pair of VMs 200 which operates in different computer nodes 100 has a relation of "master VM"/"slave VM." Typically, a VM 200 in a computer node 100 that is the master node becomes the "master VM," and a VM 200 in a computer node 100 that is the slave node becomes the "slave VM." The pair of VMs 200 having the relation of "master VM"/"slave VM" is constituted between two single VMs 200 in some cases. In cases where a plurality of VM groups in one computer node 100 execute an application and provide service in cooperation, the pair might be constituted between VM groups each constituted by a plurality of VMs 200. If an abnormality occurs in operation of the master VM, system switching processing is conducted to switch the relation of "master VM"/"slave VM."

The AP 211 processes a request from the terminal 2. No matter whether the VM 200 in which the AP 211 itself operates is a master VM or a slave VM, the AP 211 reads a request from the terminal and conducts operation processing. However, a response operation for the terminal 2 differs. The AP 211 operating in the master VM returns a result of the operation to the terminal 2, whereas the AP 211 operating in the slave VM does not return the operation result. The AP 211 switches the response operation for the terminal 2 by conducting "system switching."

The multiplex control agent program 212 is a program that conducts information communication with the multiplex control base program 300. The multiplex control agent program 212 monitors the operation state of the AP211, and notifies the multiplex control base program 300 of the operation state of the AP211. The multiplex control agent program 212 conducts system switching of the AP 211 in accordance with an order from the multiplex control base program 300. Details of a method for monitoring the operation state of the AP 211 will be described later with reference to FIGS. 11 and 12.

The guest OS 213 controls operations of the AP211 and the multiplex control agent program 212 in the environment of the VM 200.

The multiplex control base program 300 exchanges information with a multiplex control base program 300 operating in the other computer node 100, thereby judges states of VMs 200 in the virtualization multiplex system 1 and controls system switching of "master VM"/"slave VM" of the VMs 200. The multiplex control base program 300 operating in a computer node 100 that is the master node orders state judgment of VMs 200 and execution of system switching, whereas the multiplex control base program 300 operating in a computer node 100 that is the slave node monitors the alive/dead state of the master node. A scheme in which monitoring of the computer node 100 is conducted from both the master node and the slave node is also possible. In the present embodiment, however, the monitoring is executed from only the slave node. However, the thought of the present invention is not restricted to it. Details of the state judgment of VMs 200 conducted by the multiplex control base program 300 will be described later with reference to FIG. 13. Details of the system switching and the alive/dead state monitoring processing will be described later as description of processing conducted by the computer node monitoring unit 305 with reference to FIGS. 14, 15, 16, 17, 18 and 19.

The computer node structure management table 301 is a table used by the multiplex control base program 300 to manage states of the computer node 100 such as the master node/slave node. Details will be described later with reference to FIG. 3.

The VM state management table 302 is a table used by the multiplex control base program 300 to manage states of the VMs 200 in the computer node 100 such as the master VM/slave VM. Details will be described later with reference to FIG. 4.

The resource management table 303 is a table used by the multiplex control base program 300 to manage "resources" such as the memory 101 used by the VMs 200, APs executed by the VMs 200, and relations to other VMs 200. Details will be described later with reference to FIG. 5.

The system switching control table 304 is a table describing failure contents and operations corresponding to them, to be used by the multiplex control base program 300 when, for example, an abnormality has occurred in resources used by the VMs 200. Details will be described later with reference to FIGS. 6 and 7.

The computer node monitoring unit 305 is processing used by the multiplex control base program 300 to conduct communication with a multiplex control base program 300 operating in the other computer node 100 and conduct alive/dead state monitoring processing. Although the computer node monitoring unit 305 is a program included in the multiplex control base program 300, the computer node monitoring unit 305 is activated at an opportunity independent from that of the processing of the multiplex control base program 300. Details will be described later with reference to FIGS. 14, 15, 16, 17, 18 and 19.

Figure 2:
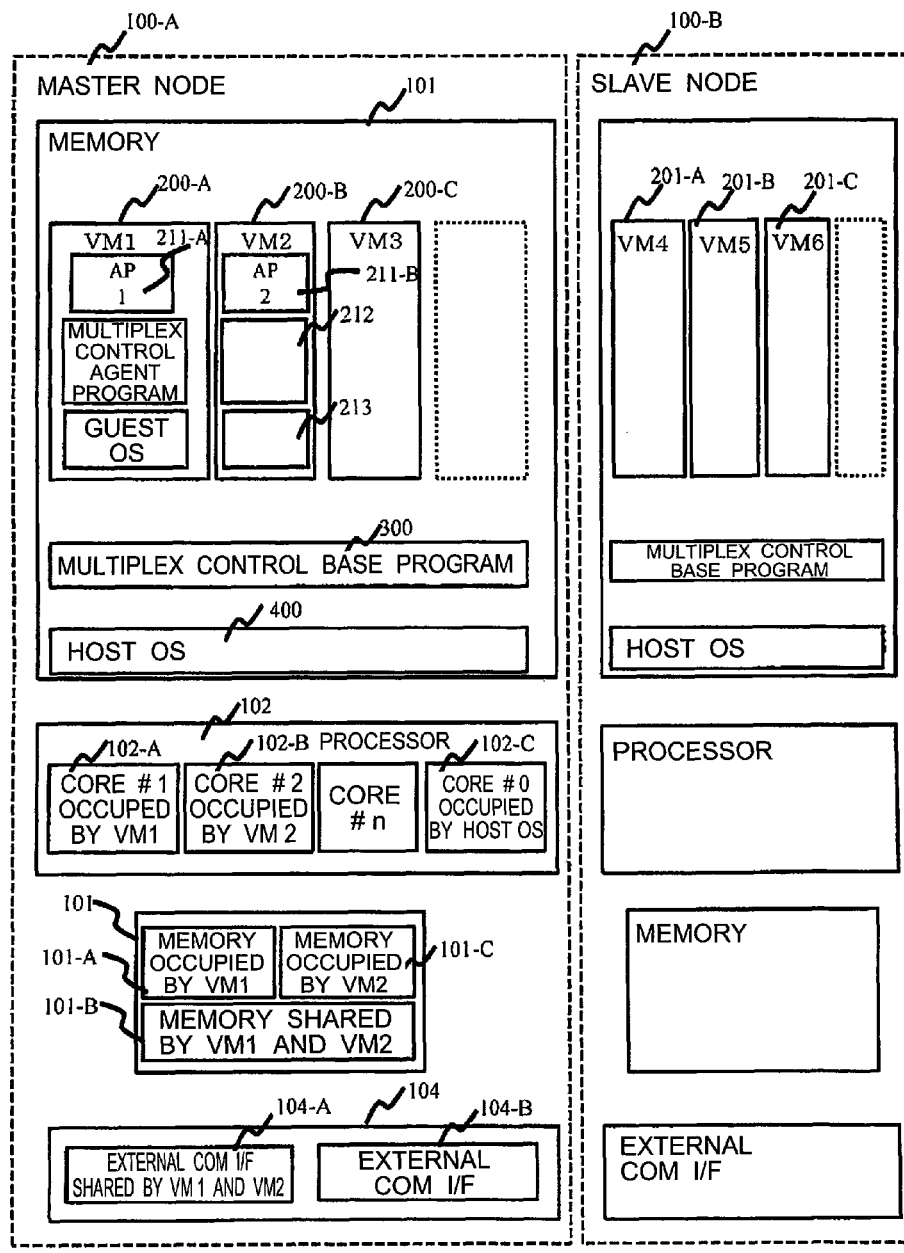
FIG. 2 is a diagram showing a structure example of a computer node.

<FIG. 2: Virtualization Environment Structure Example>

FIG. 2 is a diagram showing an example of a computer node. The VM 200 which is an operation environment of an application and an operating system is an execution environment of a virtual computer. As a matter of fact, the VM 200 is constructed by assigning existing resources such as the memory 101 and the processor 102 in the computer node 100.

FIG. 2 is a diagram showing an example in which resources such as the memory 101, the processor 102, and the external communication I/F 104 are assigned to a plurality of VMs 200 and the host OS 400.

In FIG. 2, a plurality of VMs 200 (VM1 200-A, VM2 200-B, and VM3 200-C) are generated in the computer node A 100-A. The memory 101 can be divided into a plurality of memory areas, and respective memory areas are assigned to or shared by the VMs 200 and the host OS 400. The processor 102 is a "multi-core" processor, and is assigned to or shared by the VMs 200 and the host OS 400 by taking a core as the unit. There are a plurality of external communication I/Fs 104 in the computer node 100, and respective external communication I/Fs 104 are assigned to or shared by the VMs 200 and the host OS 400.

The virtual environment VM1 200-A is constructed by using resources of a core #1 102-A occupied by the VM1 in the processor 102, a memory 101-A occupied by the VM1, a memory area in a memory 101-B shared by the VM1 and VM2, and an external communication I/F 104-A shared by the VM1 and VM2. The virtual environment VM1 200-A is constructed by using resources of a core #2 102-B occupied by the VM2 in the processor 102, a 101-C occupied by the VM2, a memory area in the memory 101-B shared by the VM1 and VM2, and the external communication OF 104-A shared by the VM1 and VM2.

A core #0 102-C occupied by the host OS in the processor 102 which is a resource assigned to neither the VM1 200-A nor the VM2 200-B is a processor core used by only the host OS 400 and it is not used by the VM 200. An external communication I/F 104-B is used by the host OS 400 and VMs 200 other than the VM1 200-A and VM2 200-B.

A plurality of VMs 201 (VM4 201-A, VM5 201-B, and VM6 201-C) are generated in the computer node B 100-B as well. Resources in the computer node B 100-B are assigned to the respective VMs 201 and the host OS 400.

<FIG. 3: Computer Node Structure Management Table>

FIG. 3 is a diagram showing a structure example of the computer node structure management table 301. The computer node structure management table 301 is retained in the multiplex control base program 300, and the computer node structure management table 301 stores state information of the computer nodes 100 in the virtualization multiplex system 1. The computer node A 100-A and the computer node B 100-B in the virtualization multiplex system 1 retain the computer node structure management tables 301 having the same contents.

Unique information which identifies a computer node 100 in the virtualization multiplex system 1 is stored in a computer node identifier 311.

Information which identifies whether each computer node 100 is in the state of "master node" or in the state of the "slave node" is stored in a master/slave state flag 312. If the object computer node 100 is in the master node, "M" is stored in the master/slave state flag 312. If the object computer node 100 is in the slave node, "S" is stored in the master/slave state flag 312.

A multicast address of the internal network 4 for accessing the computer node 100 is stored in a multicast address 313.

Information which identifies the normal/abnormal state of the computer node 100 is stored in an alive/dead state flag 314. If the computer node 100 is in the "normal state," a value "0" is stored in the alive/dead state flag 314. If the computer node 100 is in the "abnormal state," a value "1" is stored in the alive/dead state flag 314. In the embodiment of the present invention, the normal/abnormal state is represented by the "0/1" value. However, the stored information is not restricted to the "0/1" value as long as the normal/abnormal state can be identified by referring to the information.

A period time for monitoring the state of the computer node 100 is stored in a monitoring period 315. The computer node monitoring unit 305 in the multiplex control base program 300 in the slave node acquires the state of the computer node 100 in the master node 100. The master node returns state information in response to a state acquisition request from the computer node 100 in the slave node.

An alive/dead definite counter 316 stores a threshold for judging that the computer node 100 of the opposite party is in the abnormal state in cases where there is no response to the state acquisition request of the computer node 100. If a return from the computer node 100 of the other party in response to a state acquisition request is absent consecutively the number of times stored in the alive/dead definite counter 316, then the computer node 100 of the other party is judged to be in the abnormal state.

<FIG. 4: VM State Management Table>

FIG. 4 is a diagram showing a structure of the VM state management table 302 in the embodiment of the present invention. The VM state management table 302 is retained in the multiplex control base program 300, and the VM state management table 302 retains state information of the VMs 200 generated in the computer node 100.

State information stored in the VM state management table 302 differs every computer node 100. The VM state management table 302 in the computer node A 100-A retains state information of the VM1 200-A, VM2 200-B and VM3 200-C. The VM state management table 302 in the computer node B 100-B retains state information of the VM4 201-A, VM5 201-B and VM6 201-C.

The total number of VMs 200 generated in one computer node 100 is stored in a total number 321 of managed VMs.

The number of VMs 200 that are in the abnormal state among the VMs 200 generated in one computer node 100 is stored in total number 322 of failed VMs. The total number 322 of failed VMs assumes a value that is at least "0" and is at most the value in the total number 321 of managed VMs.

Information which uniquely identifies a VM 200 in the multiplexing 1 is stored in a VM identifier 323. A row 328 indicates that the row stores state information of the VM1 200-A.

A host computer node identifier 324 stores identification information of a computer node 100 in which the VM 200 is generated.

Information which identifies whether the VM 200 is "master VM" or "slave VM" is stored in a master/slave state flag 325. If the object VM 200 is a master VM, "M" is stored. If the object VM 200 is a slave VM, "S" is stored.

Information which identifies the normal/abnormal state of the VM 200 is stored in an alive/dead state flag 326. If the VM 200 is in the "normal state," a value "0" is stored. If the VM 200 is in the "abnormal state," a value "1" is stored. In the embodiment of the present invention, the normal/abnormal state is represented by the value "0/1." However, the stored information is not restricted to the value "0/1" as long as the normal/abnormal state can be identified by referring to information.

Information of a VM 200 that is in a relation of master VM/slave VM to the VM 200 represented by the VM identifier 323 is stored in master/slave structure VM information 327. Identification information of a computer node 100 in which the corresponding VM 200 is generated is stored in a host computer node identifier 327-A. Identification information which uniquely identifies the corresponding VM 200 is stored in a VM identifier 327-B.

<FIG. 5: Resource Management Table>

FIG. 5 is a diagram showing the structure example of the resource management table 303. The resource management table 303 is retained in the multiplex control base program 300. The resource management table 303 stores state information of individual resources used by the VM 200. The state information stored in the resource management table 303 differs every computer node 100. The resource management table 303 in the computer node A 100-A retains state information of resources used by the VM1 200-A, VM2 200-B and VM3 200-C. The resource management table 303 in the computer node B 100-B retains state information of resources used by the VM4 201-A, VM5 201-B and VM6 201-C.

Information which uniquely identifies the VM 200 is stored in a VM identifier 331. Information which uniquely identifies a resource used by the VM 200 is stored in a resource identifier 332. A row 336 means that the VM1 200-A uses an AP1 211-A as its resource.

A period time for monitoring a normal/abnormal state of a resource in use is stored in a monitoring period 333. Acquisition of the resource state is conducted at an opportunity such as an event. If periodic monitoring is not conducted, "0" which is an invalid value is stored.

Information which identifies the normal/abnormal state of a resource in use is stored in a resource alive/dead state flag 334. If the state of the resource is "normal state," a value "0" is stored. If the state of the resource is "abnormal state," a value "1" is stored. In the embodiment of the present invention, the normal/abnormal state is represented by the "0/1" value. However, the stored information is not restricted to the "0/1" value as long as the normal/abnormal state can be identified by referring to the information.

Items of a possession state 335-A and individual information 335-B are included in resource detailed information 335. A mode of use of a resource by the VM 200 is stored in the possession state 335-A. Information indicating an acquisition means of the resource state is stored in the individual information 335-B.

For example, a value "OCCUPIED" in the possession state 335-A shown in FIG. 5 means that a resource in use is used only by the VM1 200-A (row 336). "SHARED" means that the resource in use is used by the VM1 200-A and other VMs 200 (row 338). "logical/server" means that the VM1 200-A forms a group having a logical connection in conjunction with the VM2 200-B and is in a relation of "server" (row 339). "logical/client" means that the VM2 200-B forms a group having a logical connection in conjunction with the VM1 200-A and is in a relation of "client" (row 340).

For example, a value "212" in the individual information 335-B shown in FIG. 5 means that the multiplex control agent program 212 acquires a state of a resource in use AP1 211-A (row 336). "EVT" means that acquisition of a state of the memory 101-A occupied by the VM1 which is a resource in use is conducted by detecting a signal sent by a hardware function in the computer node 100 which senses a hardware state (row 337). In the example shown in FIG. 5, the multiplex control agent program 212 acquires the state of the resource in use AP1 211-A at periods of a value stored in the monitoring period 333 (row 336). In case of "EVT," however, the hardware function sends the signal only when a change has occurred in the state of the memory 101-A occupied by the VM1 which is the resource in use, and consequently the value stored in the monitoring period 333 is not used (row 337).

<FIG. 6: System Switching Control Table>

FIG. 6 is a diagram showing a structure example of the system switching control table 304. The system switching control table 304 is retained in the multiplex control base program 300. The system switching control table 304 stores rules for the multiplex control base program 300 to conduct system switching of master VM/slave VM on VMs 200 when a failure has occurred. Each of computer nodes 100 in the virtualization multiplex system 1 retains the system switching control table 304 having the same contents.

Information which identifies a failure occurrence region in the computer node 100 or the VM 200 is stored in failure contents 341. "Computer node failure" shown in FIG. 6 indicates that it is information which identifies a region causing a hindrance in operation continuation of the computer node 100 itself. As for a failure occurrence region in a VM 200, a resource identifier is stored every possession state classification of the resource in use for all VMs 200.

A VM identifier of a VM 200 that becomes an object of system switching when the failure in the failure contents 341 has occurred is stored in a system switching object VM 342. "All VMs" in FIG. 6 means that all VMs 200 existing in a computer node 100 in which a failure has occurred are determined to be objects of system switching. "Only pertinent VM" means that only a VM 200 that uses a resource in which a failure has occurred becomes an object of system switching. As a matter of fact, an identifier of the VM 200 is stored. "All relating VMs" means that a plurality of VMs 200 sharing a resource in which a failure has occurred, or a VM 200 using the resource in which the failure has occurred and a plurality of VMs 200 that are in a logical group relation to the VM 200 become objects of system switching together. As a matter of fact, identifiers of a plurality of VMs 200 that become objects of system switching are stored.

Information which identifies whether to apply "majority decision logic" when executing system switching of VMs 200 is stored in whether it is necessary to apply majority decision logic 343. "Necessary" means that "majority decision logic" is applied. "Not" means that "majority decision logic" is not applied. The "majority decision logic" is processing of re-evaluating a VM 200 that becomes a system switching object of master VM/slave VM. A decision is made whether the total number obtained from the total number 322 of failed VMs in the VM state management table 302 and VMs 200 in the system switching object VM 342 is at least half of the total number 321 of managed VMs in the VM state management table 302. VMs 200 that become system switching objects are determined on the basis of the decision. In case of majority, the "majority decision logic" makes a decision all VMs to be system switching objects. If the total number is less than half, only the VMs 200 stored in the system switching object VM 342 are determined to be system switching objects.

Information identifying whether to apply "fail back" processing to the VMs 200 subjected to system switching is stored in whether it is possible to apply fail back processing 344. "Possible" means that the VMs 200 subjected to system switching may be failed back. "Not" means that the VMs 200 subjected to system switching must not be failed back. "Fail back" means processing of restoring the states of master VM/slave VM of the VMs 200 to those before execution of the system switching. If a failure occurs in a VM 200 that is the master VM, the multiplex control base program 300 executes system switching and the VM 200 is switched to a slave VM. The "fail back" processing is processing of restoring the VM 200 that is the slave VM after system switching to the master VM by executing system switching again when recovery from the failure is conducted later.

<FIG. 7: Example of VM1 Failure Contents and System Switching Control Contents>

FIG. 7 is a diagram showing an example of the system switching control table 304 for the VM1 200-A generated in the computer node A 100-A. The VM1 200-A uses the AP 1 211-A and the memory 101-A occupied by the VM1, as occupied resources, and the memory 101-B shared by the VM1 and VM2 and the external communication I/F 104-A shared by the VM1 and VM2, as shared resources. And the VM1 200-A is in a group relation with the VM2 200-B as a logical resource. In the failure contents 341, the AP 1 211-A and the memory 101-A occupied by the VM1 are stored as "failure of resource occupied by VM1" (row 352), the memory 101-B shared by the VM1 and VM2 and the external communication I/F 104-A shared by the VM1 and VM2 are stored as "failure of resource shared by VM1" (row 353), and the VM2 200-B is stored as "VM1 logical resource failure."

The row 351 is a system switching rule in cases where the computer node A 100-A in which the VM1 200-A exists has become impossible to continue operation due to a failure. All VMs 200 in the computer node A 100-A become system switching objects. The "majority decision logic" and the "fail back" processing are not applied.

The row 352 is a system switching rule in cases where the AP1 211-A and the memory 101-A occupied by the VM1 have become unusable due to a failure. Only the VM1 200-A becomes the system switching object. When executing system switching, the "majority decision logic" is applied. When the occupied resources have recovered from the failure, "fail back" processing is conducted.

The row 353 is a system switching rule in cases where the memory 101-B shared by the VM1 and VM2 and the external communication I/F 104-A shared by the VM1 and VM2, which are shared resources, have become unusable due to a failure. The VM1 200-A and the VM2 200-B both using the same resources become system switching objects. When executing system switching, the "majority decision logic" is applied. When the occupied resources have recovered from the failure, "fail back" processing is conducted.

The row 354 is a system switching rule in cases where the VM2 200-B in the group relation has become inoperable due to a failure. The VM1 200-A and the VM2 200-B in the same group become system switching objects. When executing system switching, the "majority decision logic" is applied. When the VM2 200-B has recovered from the failure, "fail back" processing is conducted.

<FIG. 8: Format of Communication Between Computer Nodes>

FIG. 8 is a diagram showing an inter-computer-node communication format 500. The inter-computer-node communication format 500 is a format of communication data transmitted and received between multiplex control base programs 300 in different computer nodes 100. The inter-computer-node communication format 500 is used in use of "alive/dead monitoring" which acquires the operation situation of the computer node 100, and "fail back," "abnormal VM system switching," and "all VM system switching" which are system switching requests of the master VM/slave M.

An identifier which identifies a computer node 100 that has generated communication data is stored in a computer node identifier 501. When generating communication data, information which identifies the communication data transmitted and received is stored in a sequence number 502 and time information which represents time when the communication data is generated is stored in a transmission time stamp 503.

A communication kind 504 stores information which identifies use of the communication data. As information which identifies communication use, one of alive/dead 504-A, fail back 504-B, abnormal VMs 504-C, and all VMs 504-D is used. In cases where "alive/dead monitoring" is conducted from a slave node to a master node, the alive/dead 504-A is used. In case of "abnormal VM system switching" in which an order of system switching of a specific master VM brought into an abnormal state is given to a slave node by a master node, abnormal VMs 504-C is used. In case of "all VM system switching" in which system switching of all master VMs is ordered, all VMs 504-D is used. In cases where "fail back" is ordered to restore switched states of the master VM/slave VM to original states when the state of the VM 200 has recovered, the fail back 504-B is used.

When conducting data communication between computer nodes 100, contents of the VM state management table 302 are stored in VM state management table contents 505 and contents of the resource management table 303 are stored in resource management table contents 506 in order to notify the other party computer node 100 of a state of the VM 200 in the own computer node 100.

In data communication between computer nodes 100 in use such as "alive/dead monitoring," response abnormality such as no response to originated data communication occurs in some cases because of, for example, occurrence of abnormality in the state of the other party computer node 100. The number of times of occurrence of response abnormality is stored in a response abnormality count 507.

<FIG. 9: Communication Format Between Multiplex Control Agent Program and Multiplex Control Base Program>

FIG. 9 is a diagram showing a communication format 600 between the multiplex control agent program and the multiplex control base program (hereafter referred to as inter-program communication format 600). The inter-program communication format 600 is a format of data communication transmitted and received between the multiplex control base program 300 and the multiplex control agent program 212 in the computer node 100.

Information which identifies a VM 200 of a communication origin/destination is stored in a VM identifier 601. Information which identifies transmitted and received communication data is stored in a sequence number 602. Time information which represents time when the communication data is generated is stored in a transmission time stamp 603.

When giving a notice of information of resources used by the VM 200 between the multiplex control base program 300 and the multiplex control agent program 212, contents of the resource management table 303 are stored in resource management table contents 604.

When it is desired to give a notice of a system switching request of master VM/slave VM between the multiplex control base program 300 and the multiplex control agent program 212, a value is set into a system switching request 605. In the embodiment of the present invention, "1" is set when there is a system switching request, whereas "0" is set when there isn't a system switching request. However, the value is not restricted to "0/1" as long as it can be identified whether there is a system switching request.

Figure 10:
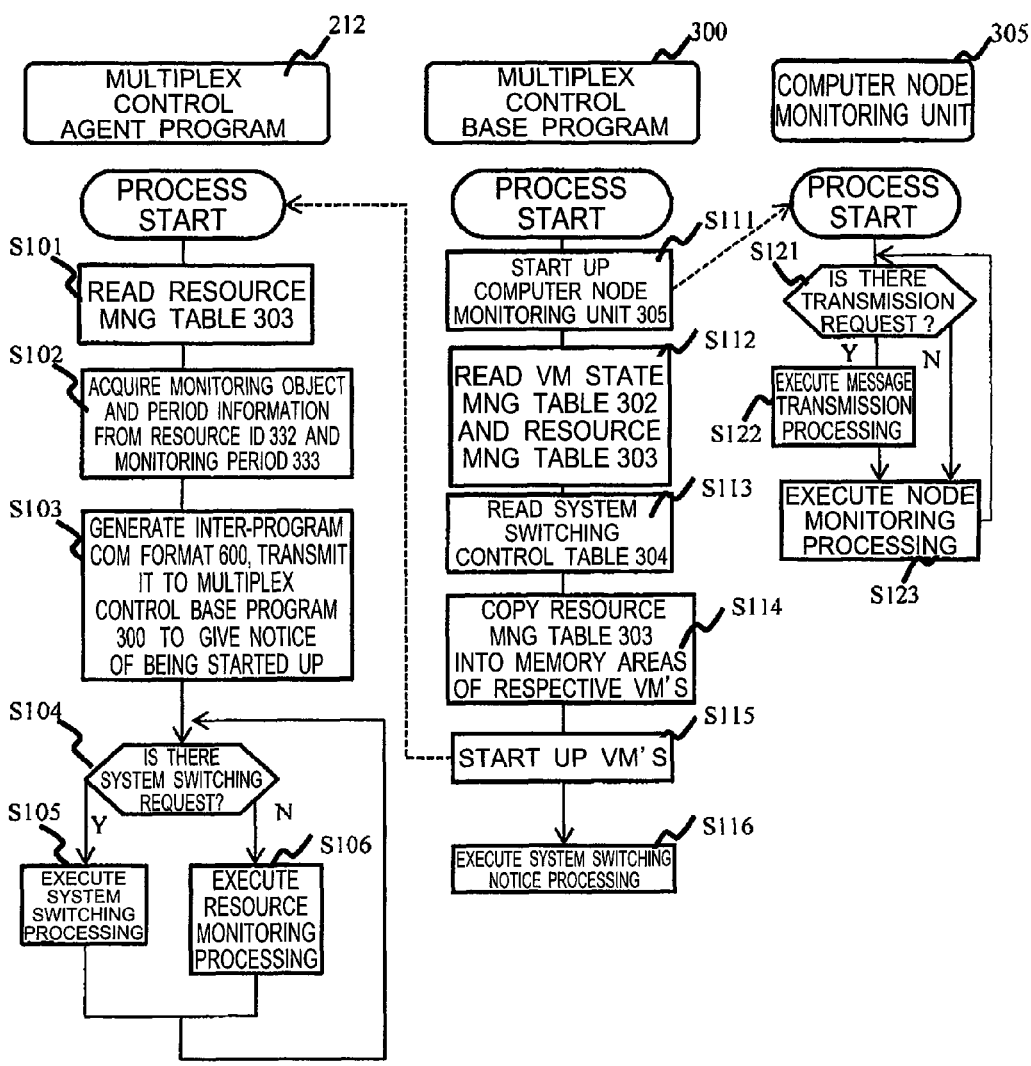
FIG. 10 is a flowchart showing an example of processing executed in the virtualization multiplex system.

<FIG. 10: General Flowchart of Virtualization Multiplex System>

FIG. 10 is a general flowchart of processing executed in the virtualization multiplex system 1. The general processing in the virtualization multiplex system 1 includes start processing and system switching notice processing S116 of the multiplex control base program 300, start processing and resource monitoring processing S106 and system switching processing of the multiplex control agent program 212, and message transmission processing S112 and node monitoring processing S123 of the computer node monitoring unit 305.

Upon developing the multiplex control base program 300 and a VM 200 in the memory 101 in a computer node 100, the host OS 400 and the processor 102 begin processing of the multiplex control base program 300. Processing of the computer node monitoring uniting unit 305 and the VM 200 is begun in processing of the multiplex control base program 300.

Upon beginning of processing, the multiplex control base program 300 first starts the computer node monitoring unit 305 (S111).

Then, the multiplex control base program 300 reads the VM state management table 302 and the resource management table 303 from the storage device 103 into the memory 101 (S112), and reads the system switching control table 304 as well into the memory 101 (S113).

The multiplex control base program 300 copies the resource management table 303 into memory areas of respective VMs 200 which are under its control (S114), and starts processing of the VMs 200 (S115).

After the S115, the multiplex control base program 300 executes the system switching notice processing S116.

Upon being started up by the multiplex control base program 300 and beginning processing, the computer node monitoring unit 305 makes a decision whether there is a transmission request of "VM switching" or "fail back" execution from the multiplex control base program 300 (S121).

If there is a transmission request from the multiplex control base program 300 (a result of the S121 is "Y"), the computer node monitoring unit 305 executes message transmission processing S112, and then executes the node monitoring processing S123. If there isn't a transmission request from the multiplex control base program 300 (a result of the S121 is "N"), the computer node monitoring unit 305 executes the node monitoring processing S123.

After execution of the node monitoring processing is finished, the computer node monitoring unit 305 executes processing from the decision 121 as to whether there is a transmission request from the multiplex control base program 300 again.

Upon beginning processing, the multiplex control agent program 212 reads the resource management table 303 in the memory area in its own VM 200 (S101).

The multiplex control agent program 212 selects individual resource management information having a value stored in the VM identifier 331 that coincides with an identifier of its own VM 200 and a value stored in the individual information 335-B that is "multiplex control agent program 212," from the resource management table 303 which is read. And the multiplex control agent program 212 acquires a resource of state monitoring object and monitoring period from the resource identifier 332 and the monitoring period 333 in the selected individual resource management information (S102).

Then, the multiplex control agent program 212 notifies the multiplex control base program 300 of the state of its own VM 200. The multiplex control agent program 212 acquires the state of the state monitoring object resource, updates the resource management table 303 in the memory area of its own VM 200, generates communication data of the inter-program communication format 600, and transmits the communication data to the multiplex control base program 300 (S103).

Then, the multiplex control agent program 212 makes a decision whether there is a system switching request of master VM/slave VM from the multiplex control base program 300 (S104).

If there is a system switching request (a result of the S104 is "Y"), the multiplex control agent program 212 executes system switching processing S105, and then executes the S104 again. The system switching processing S105 is processing of requesting the AP 211 operating in its own VM 200 to conduct system switching.

If there isn't a system switching request (the result of the S104 is "N"), the multiplex control agent program 212 executes the resource monitoring processing S106, and then executes the S104 again.

Figure 11:
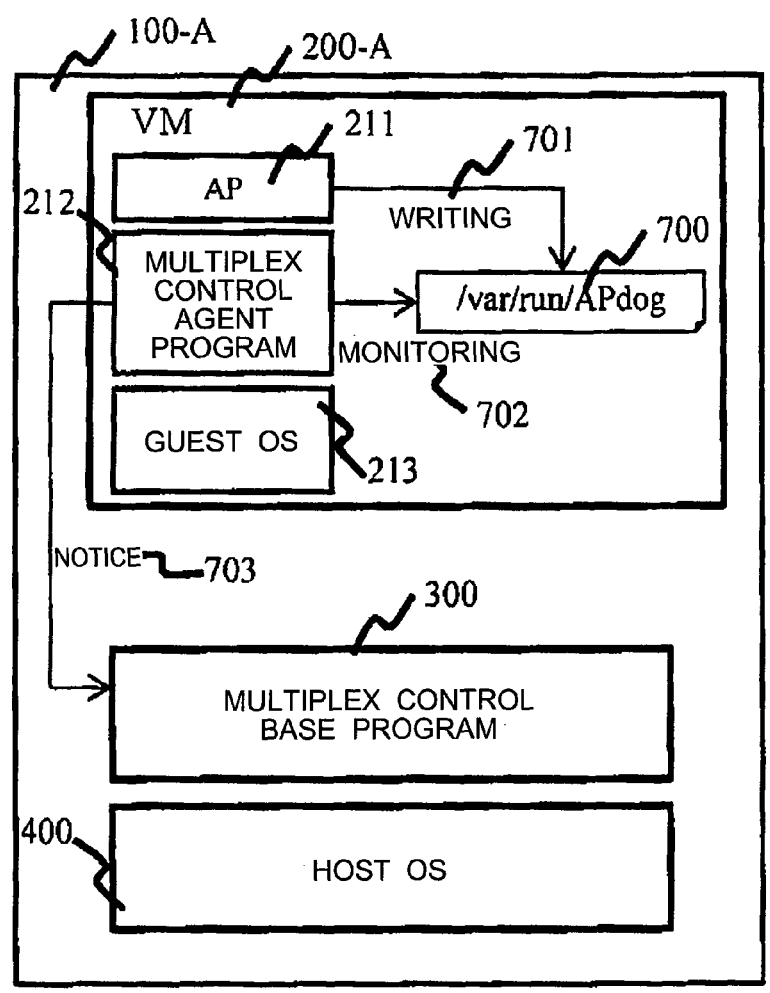
FIG. 11 is a diagram showing an example of resource monitoring processing.

<FIG. 11: Resource Monitoring Processing Outline>

FIG. 11 is a diagram showing an outline of the resource monitoring processing 106. In the present embodiment, the resource state of the multiplex control agent program 212 is judged by acquiring the execution state of the AP 211.

When the AP 211 operates, an AP dog 700 file which outputs the execution state and error information of the AP 211 is secured in an arbitrary place (for example, /var/run) in the VM 200. The AP dog 700 file is a file which can be referred to from a program other than the AP 211. The AP 211 periodically outputs its own execution state to the AP dog 700 file. The multiplex control agent program 212 monitors the execution state of the AP 211 by referring to the AP dog 700 file.

Monitoring of the resource state by the multiplex control agent program 212 is conducted as follows. For example, the operation state of the AP 211 resource is recognized by confirming that the APdog700 is updated periodically. An abnormality in the external communication I/F 104 resource is recognized by acquiring external communication abnormality information directed to the terminal 2 which is output to the APdog700 by the AP 211. An abnormality in another VM 200 resource in a logical group relation is recognized by acquiring internal communication information directed to another AP 211 which is output to the APdog700 by the AP 211.

Upon sensing a change of the resource state, the multiplex control agent program 212 notifies the multiplex control base program 300 of the resource state.

Figure 12:
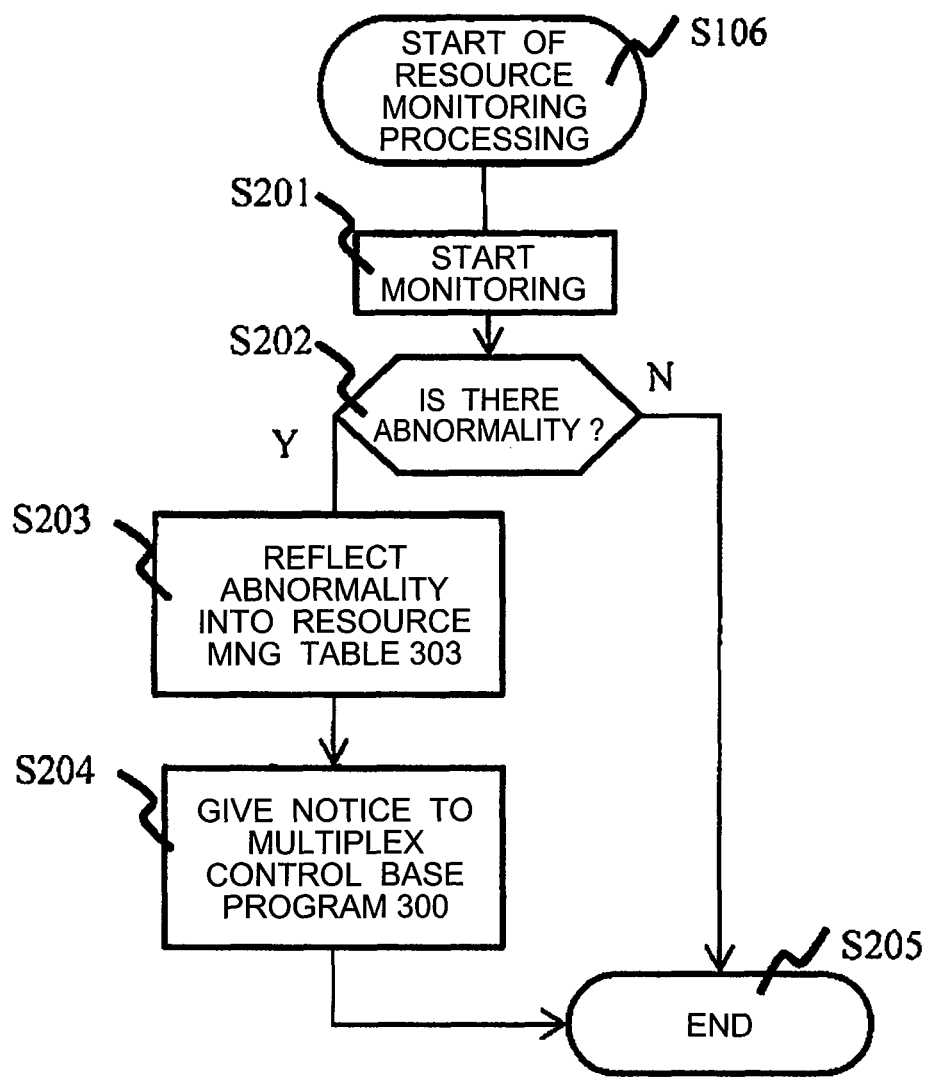
FIG. 12 is a flowchart showing an example of the resource monitoring processing.

<FIG. 12: Flowchart of Resource Monitoring Processing>

FIG. 12 is a flowchart showing an example of the resource monitoring processing S106. Upon detecting an abnormality in a monitoring object resource, the multiplex control agent program 212 notifies the multiplex control base program 300 of an abnormality state.

Upon being started, the multiplex control agent program 212 first refers to the APdog700 and begins monitoring of the resource state (S201), and makes a decision whether there is an abnormality in the monitoring object resources (S202).

If an abnormality is recognized in any of monitoring object resources (a result of the S202 is "Y"), the multiplex control agent program 212 sets "1" representing the dead state into the resource alive/dead state flag 334 for the pertinent resource in the resource management table 303 retained in the VM 200 (S203), sets the resource management table 303 into the resource management table contents 604 in the inter-program communication format 600, generates communication data, and transmits the communication data to the multiplex control base program 300 (S204), and finishes the resource monitoring processing 106 (S205).

If an abnormality is not recognized in any of the monitoring object resources (the result of the S202 is "N"), the resource monitoring processing S106 is finished (S205).

After finishing the resource monitoring processing S106, the multiplex control agent program 212 starts the S104 shown in FIG. 10 in order to make a decision whether there is a system switching request of master VM/slave VM from the multiplex control base program 300.

Figure 13:
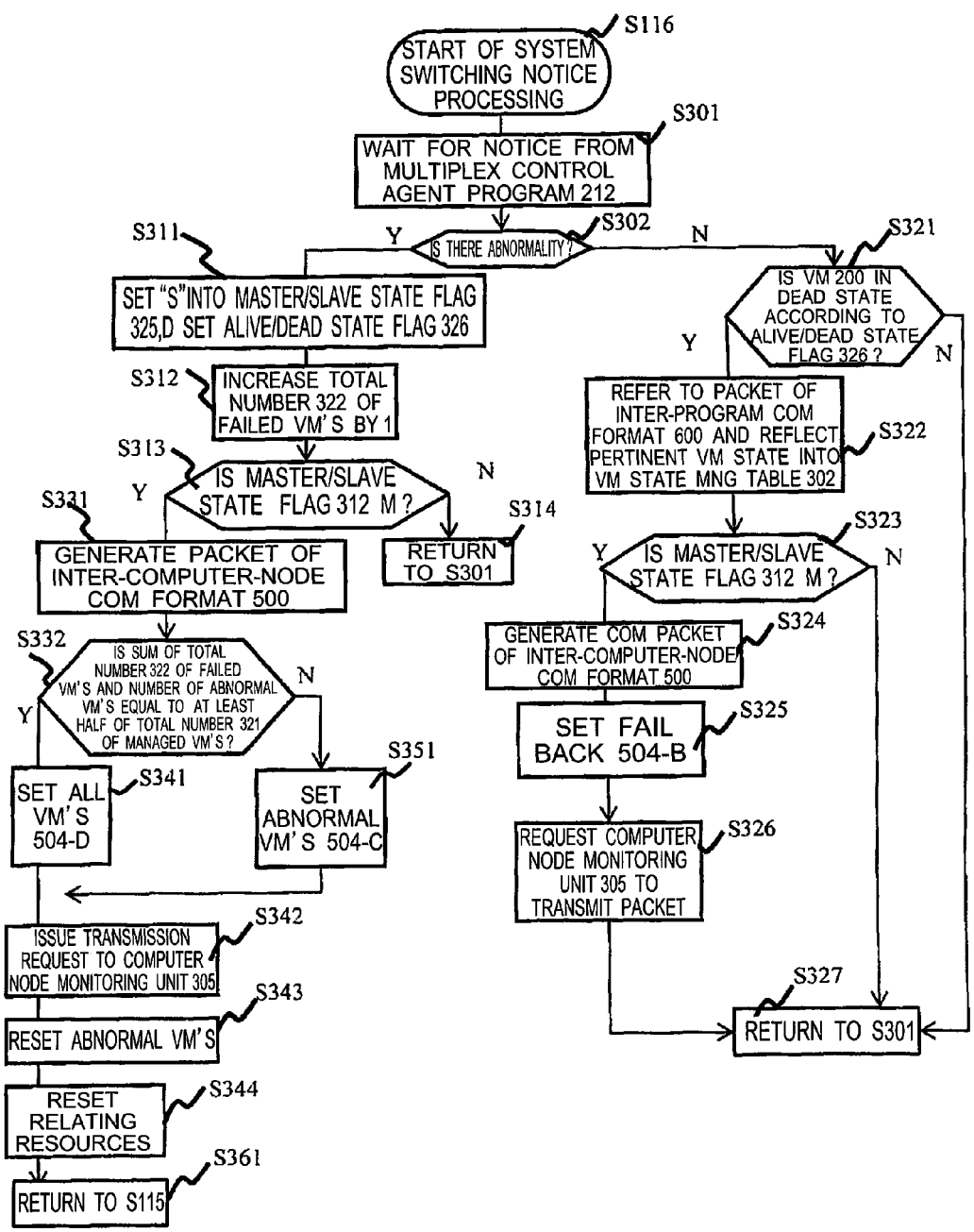
FIG. 13 is a flowchart showing an example of system switching notice processing.

<FIG. 13: Flowchart of System Switching Notice Processing>

FIG. 13 is a flowchart of the system switching notice processing S116 in the embodiment of the present invention. The multiplex control base program 300 acquires a notice of the VM 200 state from the multiplex control agent program 212 in the system switching notice processing S116, and issues a system switching request of master VM/slave VM to the computer node monitoring unit 305.

Upon beginning the system switching notice processing, the multiplex control base program 300 first waits for a notice of the VM 200 state from the multiplex control agent program 212 and a notice of hardware state detection from the computer node 100 or the host OS 400 (S301).

The multiplex control base program 300 interprets notice contents of the VM 200 state and the hardware state. If an abnormality is newly recognized in a certain VM 200 in the computer node 100 (a result of S302 is "Y"), the multiplex control base program 300 sets "S" which means the slave VM state into the master/slave state flag 325 of the pertinent VM 200 in the VM state management table 302, and sets "1" which means the dead state into the alive/dead state flag 326 (S311).

And the multiplex control base program 300 increases the value in the total number 322 of failed VMs in the VM state management table 302 by "1" (S312).

Then, the multiplex control base program 300 refers to the master/slave state flag 312 corresponding to its own computer node 100 in the computer node structure management table 301, and judges the master node/slave node state of its own computer node 100 (S313).

If the value of the master/slave state flag 312 is "S" and the own computer node 100 is in the slave node state (a result of the S313 is "N"), the multiplex control base program 300 does not conduct any processing and starts the S301 in order to wait for the notice of the VM 200 state and the hardware state again.

If the value of the master/slave state flag 312 is "M" and the own computer node 100 is in the master node state (a result of the S313 is "Y"), the multiplex control base program 300 generates a communication packet of the inter-computer-node communication format 500 in order to issue a system switching request of master VM/slave VM of an abnormal VM 200 (S331).

If the resource failure contents of the abnormal VM 200 needs application of the "majority decision logic," the multiplex control base program 300 makes a decision whether the sum of the total number 322 of failed VMs in the VM state management table 302 and the number of abnormal VMs 200 is at least half of the total number 321 of managed VMs (S332).

If the total number of failed VMs 200 is the majority (a result of the S332 is "Y"), an identification value of the all VMs 504-D is set into the communication kind 504 of the communication packet in the inter-computer-node communication format 500 in order to cause all VMs 200 inclusive of normal VMs 200 to become system switching objects (S341).

If the total number of failed VMs 200 does not become the majority (the result of the S332 is "N"), an identification value of the abnormal VMs 504-C is set into the communication kind 504 of the communication packet in the inter-computer-node communication format 500 in order to cause only abnormal VMs 200 to become system switching objects (S351).

Upon completion of the generation of the communication packet of the inter-computer-node communication format 500, the multiplex control base program 300 issues a transmission request to the computer node monitoring unit 305 (S342).

Then, the multiplex control base program 300 conducts resetting in order to stop the abnormal VMs 200 (S343), refers to the resource management table 303 and also conducts resetting on resources used by the abnormal VMs 200 (S344), and starts the S115 in order to re-start the stopped abnormal VMs 200.

If an abnormality is not recognized in a certain VM 200 in the computer node 100 on the basis of notice contents of the VM 200 state and the hardware state (the result of the S302 is "N"), the value of the alive/dead state flag 326 of the VM 200 recorded in the VM state management table 302 is referred to, in order to make a decision whether the VM 200 has recovered from the "dead state" (S321).

If the value of the alive/dead state flag 328 is "0" and the VM 200 is judged to be in "alive state" (a result of the S321 is "N"), a change does not occur in the state of the VM 200. Therefore, the multiplex control base program 300 starts the S301 in order to wait for a notice of the VM 200 state from the multiplex control agent program 212 and a notice of hardware state detection from the computer node 100 or the host OS 400 again.

If the value of the alive/dead state flag 326 is "1" and the VM 200 is judged to be in the "dead state" (the result of the S321 is "Y"), the VM 200 is judged to have recovered to the normal state. Therefore, the state of the VM 200 in the resource management table contents 604 of the communication data of the inter-program communication format 600 received from the multiplex control agent program 212 is reflected into the VM state management table 302 in the multiplex control base program 300 (S322).

Then, the master/slave state flag 312 in the computer node structure management table 301 is referred to and the master node/slave node state of the own computer node 100 is judged in order to issue a fail back request of the master VM/slave VM state of the VM 200 (S323).

If the value of the master/slave state flag 312 is "S" and the own computer node 100 is the slave node (a result of the S323 is "N"), the slave node does not issue a fail back request itself. Therefore, the multiplex control base program 300 starts the S301 in order to wait for a notice from the multiplex control agent program 212 and a notice of hardware state detection from the computer node 100 or the host OS 400 again.

If the value of the master/slave state flag 312 is "M" and the own computer node 100 is the master node (the result of the S323 is "Y"), the multiplex control base program 300 generates a communication packet of the inter-computer-node communication format 500 (S324). Since the communication kind is the fail back request, the multiplex control base program 300 sets an identification value of the fail back 504-B into the communication kind 504 (S325), requests the computer node monitoring unit 305 to transmit the generated communication packet (S326), and starts the S301 in order to wait for a notice from the multiplex control agent program 212 and a notice of hardware state detection from the computer node 100 or the host OS 400 again.

Figure 14:
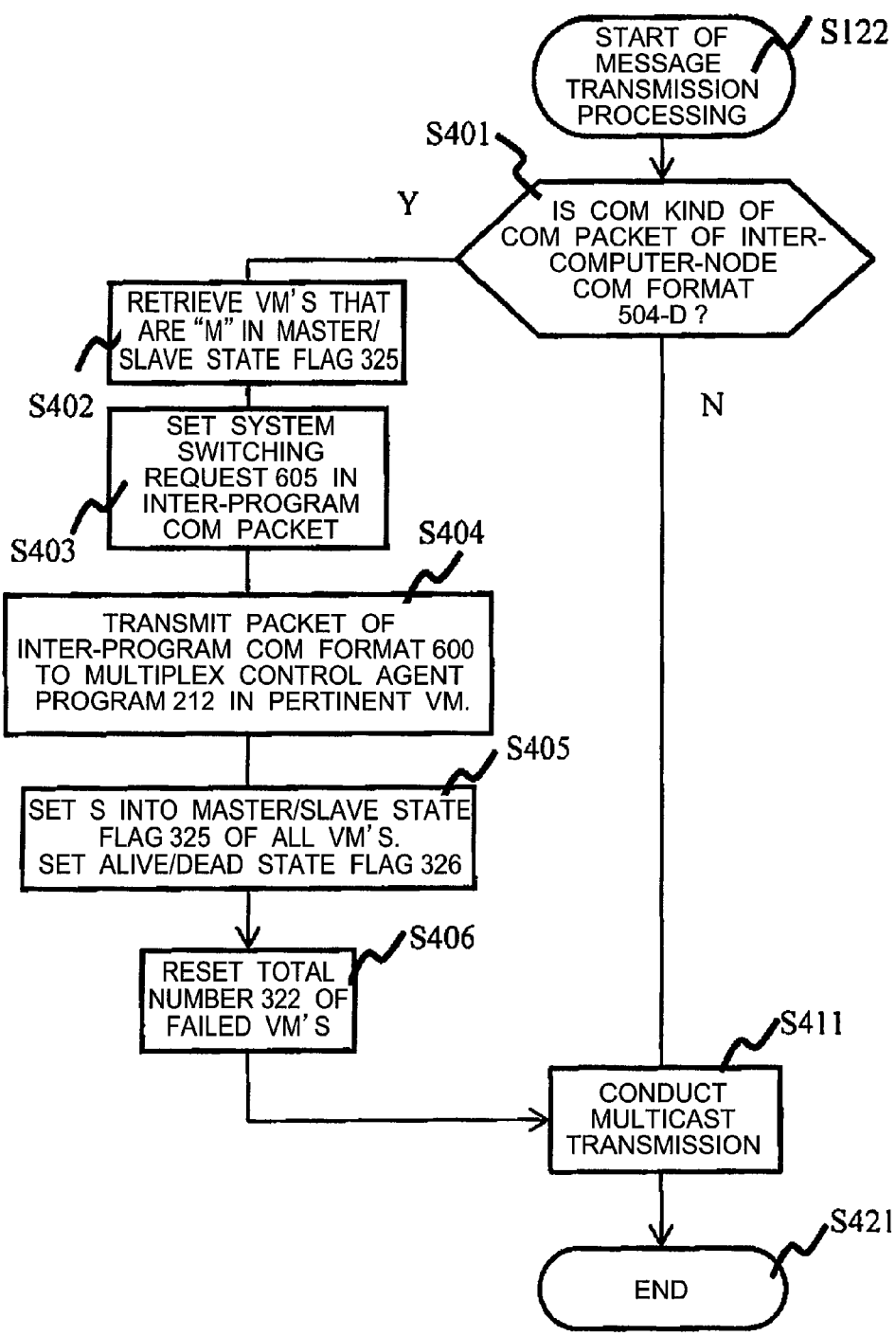
FIG. 14 is a flowchart showing an example of message transmission processing.

<FIG. 14: Flowchart of Message Transmission Processing>

FIG. 14 is a flowchart of the message transmission processing S112. The computer node monitoring unit 305 sends the "fail back" request, the "abnormal VM switching" request, or the "all VM switching" request received from the multiplex control base program 300, to the other computer node in the message transmission processing S112.

When the "all VM switching" of master VM/slave VM is executed, VMs 200 in the normal state that do not need switching originally are included in VMs 200 which become switching objects, in some cases. Pre-processing for conducting system switching of normal VMs 200 in order to execute the "all VM switching" is executed in the message transmission processing S112.

Upon beginning the message transmission processing S112, the computer node monitoring unit 305 first confirms the communication kind 504 of the communication request packet of the inter-computer-node communication format 500 in order to identify whether the kind of communication request is "all VM switching" or not (S401).

If the value in the communication kind 504 is not the identification value of the all VMs 504-D and the communication request is other than the "all VM switching" (a result of the S401 is "N"), the system switching objects are restricted to VMs 200 which have become abnormal in state or which have recovered in state. Therefore, the computer node monitoring unit 305 starts S411 and conducts multicast transmission of the communication request packet to the other computer node 100 in the virtualization multiplex system 1.

If the value of the communication kind 504 is the identification value of the all VMs 504-D and the communication request is "all VM switching" (the result of the S401 is "Y"), processing for conducting system switching on VMs 200 in the normal state is started.

The computer node monitoring unit 305 retrieves VMs 200 of the master VM that are "M" in the value of the master/slave state flag 325 in the VM state management table 302 (S402).

In order to request the retrieved VMs 200 to conduct system switching, the computer node monitoring unit 305 generates communication data having "1" set into the system switching request 605 in the inter-program communication format 600 (S403) and transmits the communication data to the multiplex control agent program 212 in the pertinent VM 200 (S404).

Then, the computer node monitoring unit 305 sets "S" which means the slave VM into the master/slave state flag 325 of all VMs 200 in the VM state management table 302, and changes the alive/dead state flag 326 to "1" which means the dead state (S405).

And the computer node monitoring unit 305 resets the value in the total number 322 of failed VMs in the VM state management table 302 to "0" (S406), and conducts multicast transmission of the communication request packet of "all VM switching" to the other computer node 100 in the virtualization multiplex system 1 (S411).

After the transmission of the communication request packet is finished at the S411, the computer node monitoring unit 305 finishes the message transmission processing S112 (S421), and starts the next node monitoring processing S123.

Figure 15:
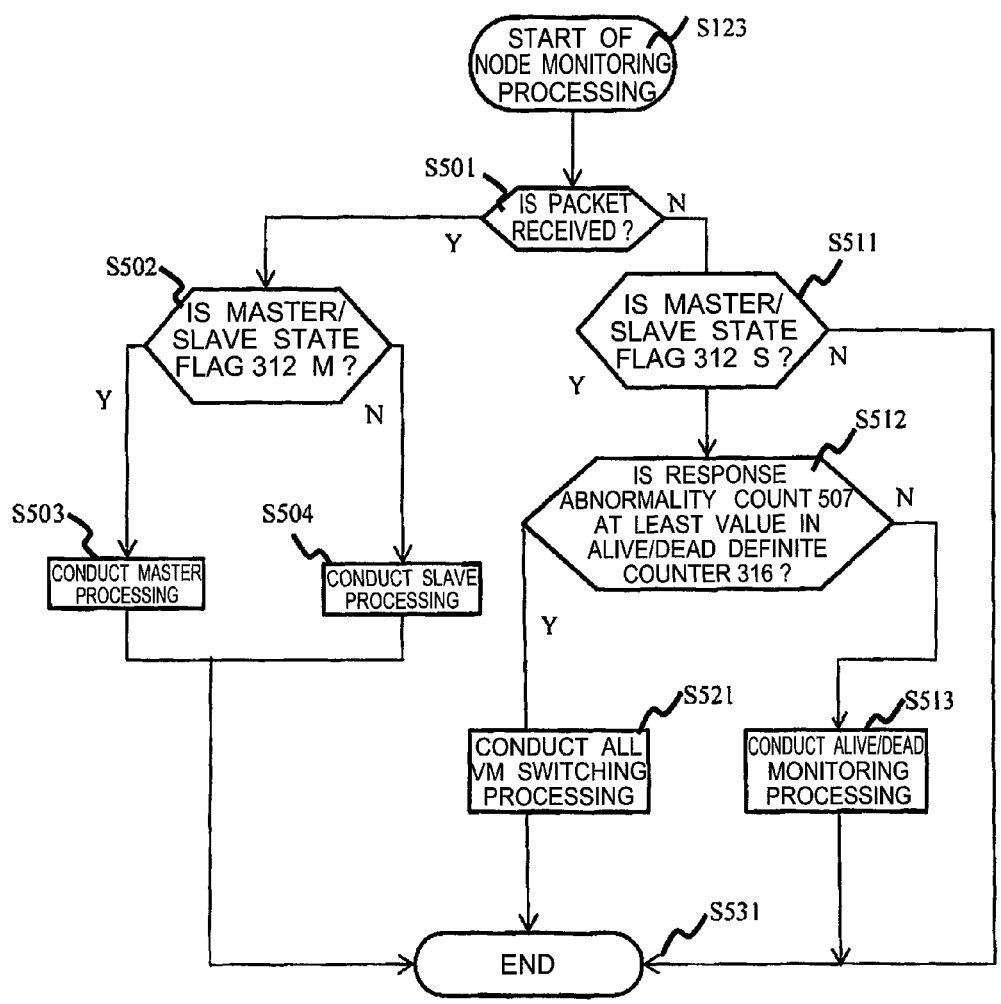
FIG. 15 is a flowchart showing an example of node monitoring processing.

<FIG. 15: Flowchart of Node Monitoring Processing>

FIG. 15 is a flowchart of the node monitoring processing S123. Inter-computer-node communication concerning the classification of the "alive/dead monitoring," "fail back," "abnormal VM switching," and "all VM switching" requests is conducted between the computer node monitoring units 305 in the multiplex control base programs 300 operating in the computer nodes 100 of the master node and the slave node. The computer node monitoring unit 305 discriminates the classification of the received inter-computer-node communication data, and starts processing depending upon the classification.

Upon beginning the processing of the node monitoring processing S123, the computer node monitoring unit 305 first makes a decision whether an inter-computer-node communication packet is received from the other computer node 100. The computer node monitoring unit 305 in the slave node receives a response to the "alive/dead monitoring," and inter-computer-node communication data of the "abnormal VM switching," "all VM switching," and "fail back" request. The computer node monitoring unit 305 in the master node receives an acquisition request of the state of the computer node 100 concerning "alive/dead monitoring" and inter-computer-node communication data which is a response to the "abnormal VM switching," "all VM switching," or "fail back" (S501).

If an inter-computer-node communication packet is received (a result of the S501 is "Y"), the computer node monitoring unit 305 refers to the master/slave state flag 312 in the computer node structure management table 301 and judges the master/slave node state of the own computer node 100. If the master/slave state flag 312 is "M" and the own computer node 100 is the master node (a result of the S502 is "Y"), the computer node monitoring unit 305 starts master processing S503. If the master/slave state flag 312 is "S" and the own computer node 100 is the slave node (the result of the S502 is "N"), the computer node monitoring unit 305 starts slave processing S504 (S502).

If the master processing S503 or the slave processing S504 is finished, the computer node monitoring unit 305 finishes the node monitoring processing S123 (S531).

If the inter-computer-node communication data is not received (the result of S501 is "N"), the computer node monitoring unit 305 refers to the master/slave state flag 312 in the computer node structure management table 301 and judges the master node/slave node state of the own computer node 100.

If the master/slave state flag 312 is "M" and the own computer node 100 is the master node (a result of S511 is "N"), the computer node monitoring unit 305 finishes the node monitoring processing S123. If the master/slave state flag 312 is "S" and the own computer node 100 is the slave node (the result of S511 is "Y"), it is meant that a response to the "alive/dead monitoring" request is not returned and consequently the computer node monitoring unit 305 starts subsequent S512 (S511).

At the S512, the computer node monitoring unit 305 compares a value in the alive/dead definite counter 316 in the computer node structure management table 301 for the computer node 100 that does not give a response to the "alive/dead monitoring" request with a value in the response abnormality count 507 in the inter-computer-node communication format 500, and judges the alive/dead state of the pertinent computer node 100.

If the value in the response abnormality count 507 is less than the value in the alive/dead definite counter 316 (a result of the S512 is "N"), the computer node monitoring unit 305 judges the pertinent computer node 100 to be still in the normal state and starts alive/dead monitoring processing S513. If the value in the response abnormality count 507 is at least the value in the alive/dead definite counter 316 (the result of the S512 is "Y"), the computer node monitoring unit 305 judges the pertinent computer node 100 to be in the abnormal state and starts all VM switching processing S521.

Upon completion of the alive/dead monitoring processing S513 or the all VM switching processing S521, the computer node monitoring unit 305 finishes the node monitoring processing S123 (S531).

After the node monitoring processing S123 has finished, the computer node monitoring unit 305 starts the decision S121 as to whether there is a transmission request from the multiplex control base program 300.

Figure 16:
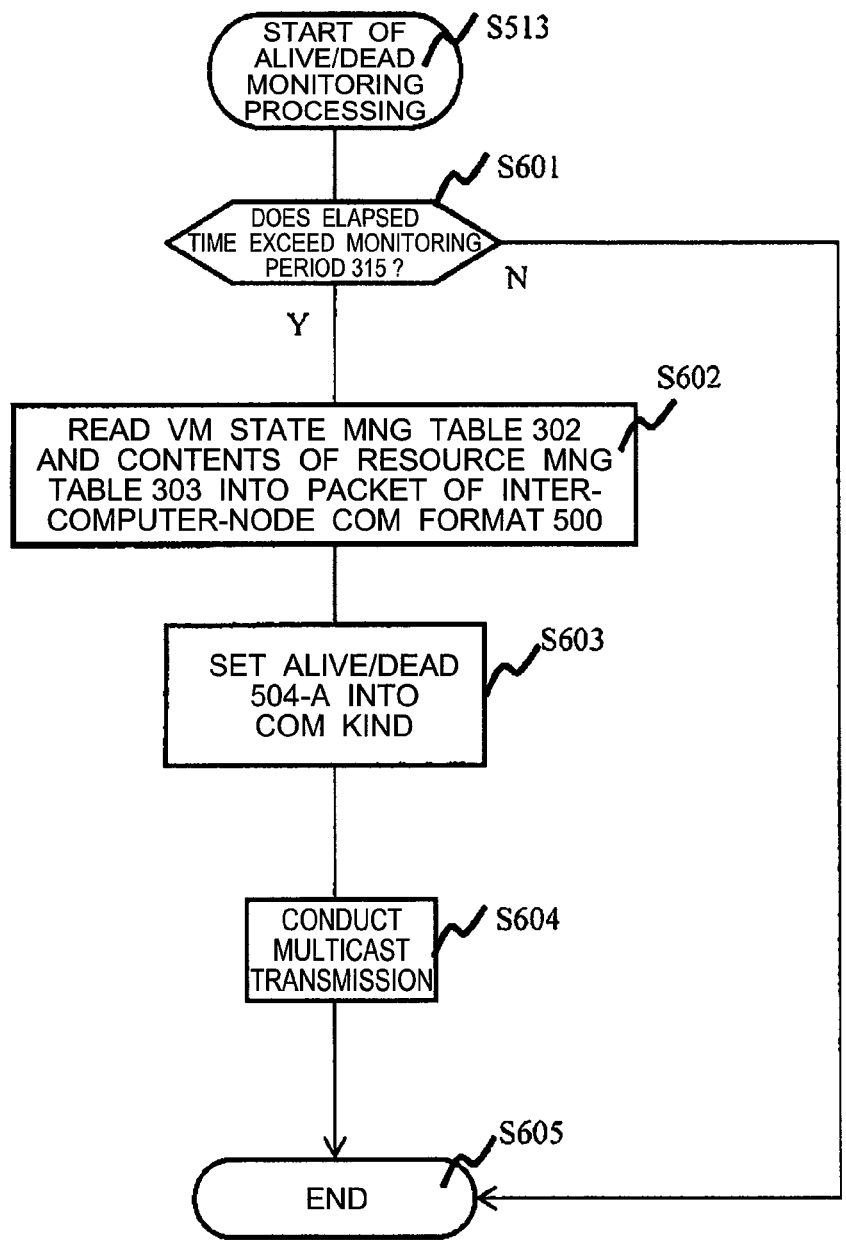
FIG. 16 is a flowchart showing an example of alive/dead monitoring processing.

<FIG. 16: Flowchart of Alive/Dead Monitoring Processing>

FIG. 16 is a flowchart of the alive/dead monitoring processing S513 in the embodiment of the present invention. The computer node monitoring unit 305 in the multiplex control base program 300 in the computer node 100 that is the slave node executes a "alive/dead monitoring" request in the alive/dead monitoring processing S513.

Upon starting the alive/dead monitoring processing S513, the computer node monitoring unit 305 in the slave node refers to the monitoring period 315 for the computer node 100 that is the master node in the computer node structure management table 301 (S601).

If an elapsed time from the "alive/dead monitoring" request issued last time does not exceed the monitoring period 315 (a result of the S601 is "N"), the computer node monitoring unit 305 finishes the alive/dead monitoring processing S513.

If the elapsed time exceeds the monitoring period 315 (the result of the S601 is "Y"), the computer node monitoring unit 305 starts subsequent S602 in order to issue a "alive/dead monitoring" request.

In order to generate a packet of the inter-computer-node communication format 500 to be sent to the computer node 100 that is the master node, the computer node monitoring unit 305 sets the VM state management table 302 in its own computer node 100 into the VM state management table contents 505, and sets contents of the resource management table 303 into the resource management table contents 506 (S602). And the computer node monitoring unit 305 sets an identification value of the alive/dead 504-A into the communication kind 504 (S603).

Then, the computer node monitoring unit 305 conducts multicast transmission of the generated packet to the computer node 100 that is the master node in the virtualization multiplex system 1 (S604).

Upon completion of the packet transmission for the "alive/dead monitoring" request, the computer node monitoring unit 305 finishes the alive/dead monitoring processing S513.

Figure 17:
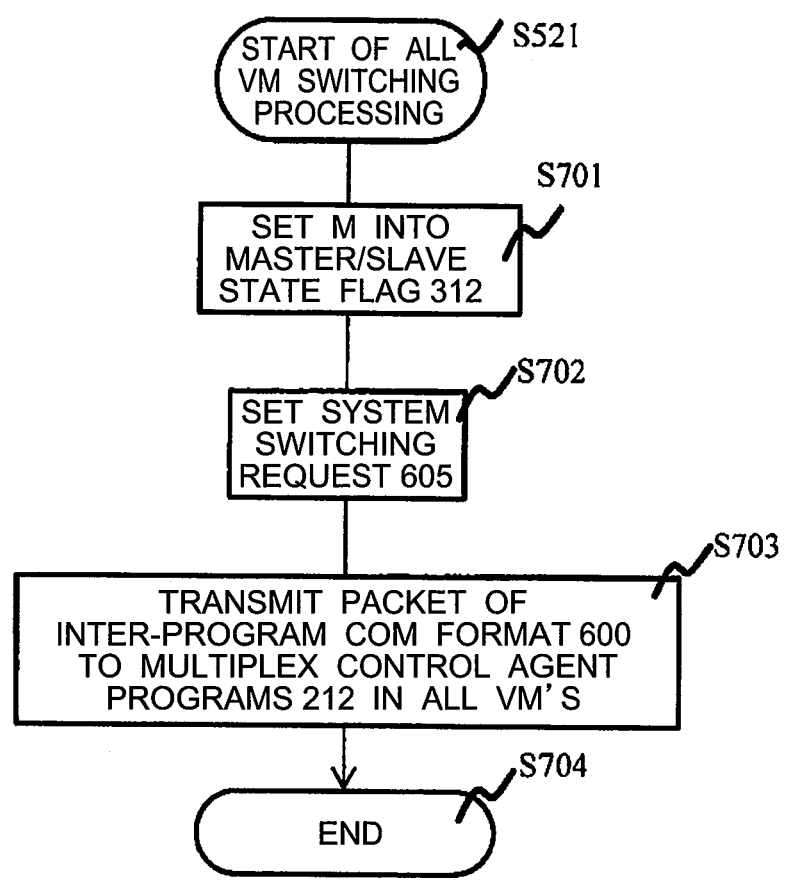
FIG. 17 is a flowchart showing an example of all VM switching processing.

<FIG. 17: Flowchart of all VM Switching Processing>

FIG. 17 is a flowchart of the all VM switching processing S521. The multiplex control base program 300 operating in the computer node 100 that is the slave node executes the all VM switching processing S521, and changes all VMs 200 in the pertinent computer node 100 to the master VM states and the pertinent computer node 100 to the master node state.

Upon starting the all VM switching processing S521, the multiplex control base program 300 first sets "M" into the master/slave state flag 312 corresponding to the own computer node 100 in the computer node structure management table 301, and changes the own computer node 100 to the master node state (S701).

Then, in order to conduct system switching of all VMs 200 in the own computer node 100, the multiplex control base program 300 generates communication data having "1" set into the system switching request 605 in the inter-program communication format 600 in order to identify execution of system switching (S702).

Then, at S703, the multiplex control base program 300 transmits the generated communication data of the inter-program communication format 600 to the multiplex control agent programs 212 in all VMs 200 in the own computer node 100. Thereafter, the multiplex control base program 300 finishes the all VM switching processing S521 at S704.

Figure 18:
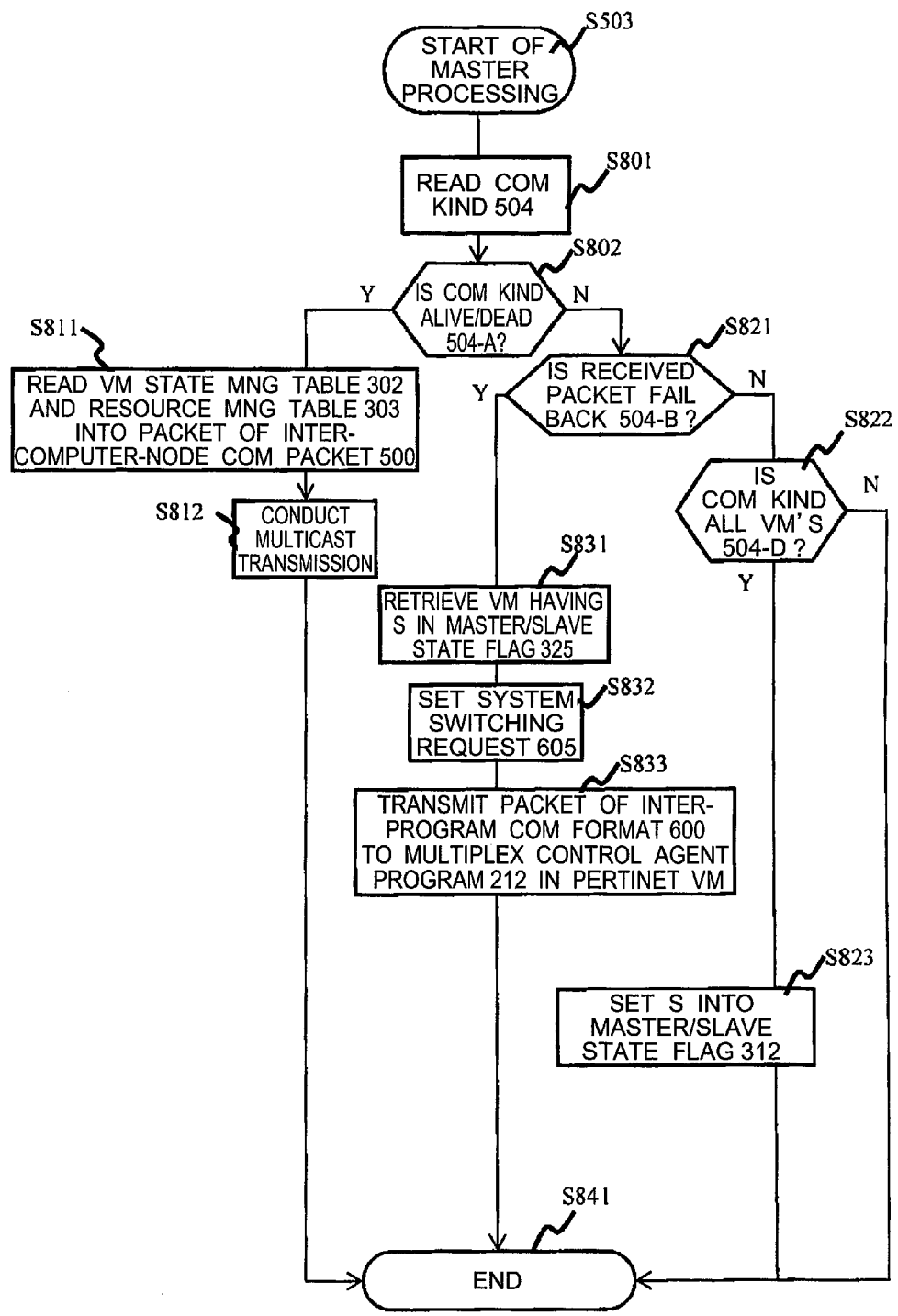
FIG. 18 is a flowchart showing an example of master processing.

<FIG. 18: Flowchart of Master Processing>

FIG. 18 is a flowchart of the master processing S503. Upon being started from the S502 in the node monitoring processing S123, the master processing S503 conducts processing with respect to the "alive/dead monitoring" request and a response of "fail back," "abnormal VM switching," or "All VM switching" from the computer node 100 that is the slave node.

Upon beginning processing, the master processing S503 first refers to the communication kind 504 of the received packet in the inter-computer-node communication format 500 (S801), and makes a decision whether the received packet is a received packet of "alive/dead monitoring" request.

If the communication kind 504 of the received packet is the identification value of the alive/dead 504-A (a result of S802 is "Y"), S811 is started and reply processing of the state of the own computer node 100 is begun. If the communication kind 504 of the received packet is not the identification value of the alive/dead 504-A (the result of S802 is "N"), S821 is started in order to further identify the classification of the received packet (S802).

In a reply packet of the inter-computer-node communication packet 500, contents of the VM state management table 302 of the own computer node 100 are set into the VM state management table contents 505 and contents of the resource management table 303 are set into the resource management table contents 506 at S811.

Then, the generated reply packet for the "alive/dead monitoring" request is transmitted to the computer node 100 that is the slave node in a multicast form at S812. Then, the master processing S503 is finished.

At the S821, a decision is made whether the received packet is a response of "fail back." If the communication kind 504 of the received packet is the identification value of the fail back 504-B (a result of the S821 is "Y"), S831 is started in order to conduct "fail back" processing in the computer node 100 that is the master node. If the communication kind 504 of the received packet is not the identification value of the fail back 504-B (the result of the S821 is "N"), S822 is started in order to further identify the classification of the received packet.

At the S831, the master/slave state flag 325 in the VM state management table 302 is referred to. A VM 200 of the slave VM having a value of "S" is searched for, and it is made an object of system switching to the master VM.

Then, communication data having "1" representing a system switching request set into the system switching request 605 in the inter-program communication format 600 is generated (S832).

At subsequent S833, the communication data generated at the S832 is transmitted to the multiplex control agent program 212 in the VM 200 of the system switching object searched for at the S831. Then, the master processing S503 is finished.

At the S822, a decision is made whether the received packet is a response to "all VM switching." If the communication kind 504 of the received packet is the identification value of all VMs 504-D (a result of the S822 is "Y"), S823 is started and the own computer node 100 is changed to the slave node state by setting "S" into the master/slave state flag 312 corresponding to the own computer node 100 in the computer node structure management table 301. Then, the master processing S503 is finished.

If the communication kind 504 of the received packet is not the identification value of all VMs 504-D (the result of the S822 is "N"), the master processing S503 is finished.

Figure 19:
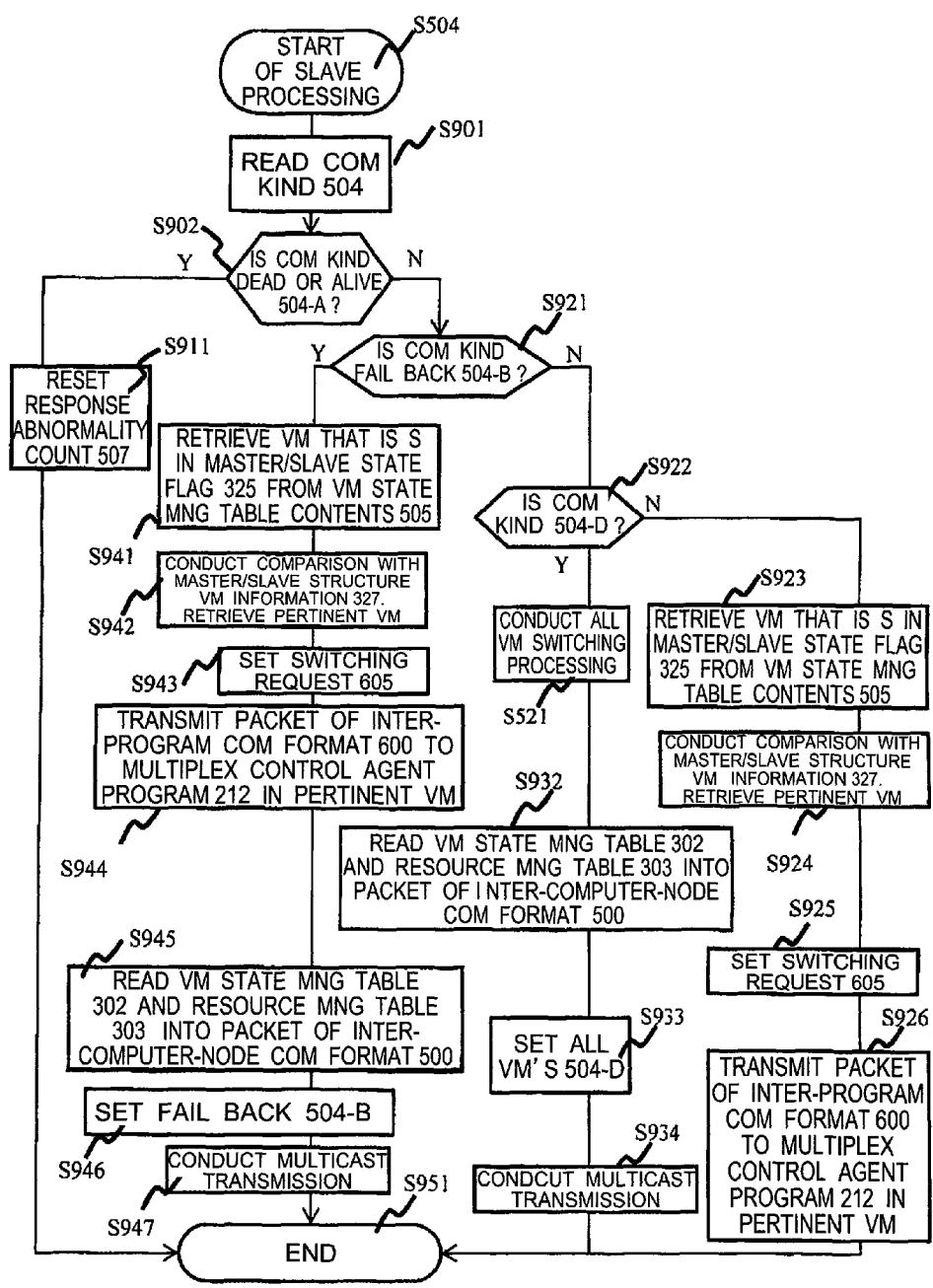
FIG. 19 is a flowchart showing an example of slave processing.

<FIG. 19: Flowchart of Slave Processing>

FIG. 19 is a flowchart of the slave processing S504. Upon being started from the S502 in the node monitoring processing S123, the slave processing S504 conducts processing with respect to a response to the "alive/dead monitoring" request and a "fail back," "abnormal VM switching," or "All VM switching" request from the computer node 100 that is the master node.

Upon beginning processing, the slave processing S504 first refers to the communication kind 504 of the received packet in the inter-computer-node communication format 500 (S901), and makes a decision whether the received packet is a received packet of a response to the "alive/dead monitoring" request. If the communication kind 504 of the received packet is the identification value of the alive/dead 504-A (a result of S902 is "Y"), S911 is started and processing of the "alive/dead monitoring" is conducted. If the communication kind 504 is not the identification value of the alive/dead 504-A (the result of S902 is "N"), S921 is started in order to further identify the classification of the received packet (S902).

At S911, the computer node 100 that is the master node can be judged to be in the normal state because there is a reply to the "alive/dead monitoring" request. Therefore, the value in the response abnormality count 507 of the communication packet in the inter-computer-node communication format 500 is reset to "0." Then, the slave processing S504 is finished.

At the S921, a decision is made whether the received packet is a "fail back" request. If the communication kind 504 of the received packet is the identification value of the fail back 504-B (a result of the S921 is "Y"), S941 is started in order to conduct "fail back" processing in the computer node 100 that is the slave node. If the communication kind 504 of the received packet is not the identification value of the fail back 504-B (the result of the S921 is "N"), S922 is started in order to further identify the classification of the received packet.

At the S941, the VM state management table 302 information stored in the VM state management table contents 505 of the received packet in the inter-computer-node communication format 500 is referred to. And a VM 200 in the computer node 100 in the master node that is "S" in the value of the master/slave state flag 325 and that is in the slave VM state is retrieved.

Then, an identifier of the own computer node 100 and an identifier of a VM 200 in the own computer node 100 are compared with the host computer node identifier 327-A and the VM identifier 327-B in the master/slave structure VM information 327 of the VM 200 retrieved at the S941, and a VM 200 in the own computer node 100 coming under system switching is retrieved (S942).

Then, in order to issue a system switching request to the pertinent VM 200, communication data having "1" representing a system switching request set into the system switching request 605 in the inter-program communication format 600 is generated at S943. At S944, the generated communication data is transmitted to the multiplex control agent program 212 in the pertinent VM 200.

Then, in order to give a response of "fail back" to the computer node 100 that is the master node, a communication packet with contents of the VM state management table 302 and the resource management table 303 in the own computer node 100 being stored into the VM state management table contents 505 and the resource management table contents 506 in the inter-computer-node communication format 500 is generated at S945. At subsequent S946, the identification value of the fail back 504-B is set into the communication kind 504 in the communication packet.

At subsequent S947, the generated communication packet is transmitted to the computer node 100 that is the master node in the virtualization multiplex system 1 in a multicast form. Then, the slave processing S504 is finished.

At the S922, a decision is made whether the received packet is a "all VM switching" request. If the communication kind 504 of the received packet is the identification value of all VMs 504-D (a result of the S922 is "Y"), the all VM switching processing S521 is started in order to conduct "all VM switching" processing in the computer node 100 that is the slave node. If the communication kind 504 of the received packet is not the identification value of all VMs 504-D (the result of the S922 is "N"), S923 is started in order to conduct "abnormal VM switching" processing in the computer node 100 that is the slave node.

After the all VM switching processing S521 is finished, a communication packet with contents of the VM state management table 302 and the resource management table 303 in the own computer node 100 being stored into the VM state management table contents 505 and the resource management table contents 506 in the inter-computer-node communication format 500 is generated at S932 in order to give a response of "all VM switching" to the computer node 100 that is the master node. At subsequent S933, the identification value of the all VMs 504-D is set into the communication kind 504 in the communication packet.

Then, at subsequent S934, the generated communication packet is transmitted to the computer node 100 that is the master node in the virtualization multiplex system 1 in a multicast form. Then, the slave processing S504 is finished.

At the S923, in order to conduct "abnormal VM switching" processing, the VM state management table 302 information stored in the VM state management table contents 505 of the received packet in the inter-computer-node communication format 500 is referred to. And a VM 200 in the computer node 100 in the master node that is "S" in the value of the master/slave state flag 325 and that is in the slave VM state is retrieved.

Then, an identifier of the own computer node 100 and an identifier of a VM 200 in the own computer node 100 are compared with the host computer node identifier 327-A and the VM identifier 327-B in the master/slave structure VM information 327 of the VM 200 retrieved at the S923, and a VM 200 in the own computer node 100 coming under system switching is retrieved (S924).

Then, in order to issue a system switching request to the pertinent VM 200, communication data having "1" representing a system switching request set into the system switching request 605 in the inter-program communication format 600 is generated at S925. At subsequent S926, the generated communication data is transmitted to the multiplex control agent program 212 in the pertinent VM 200. The slave processing S504 is finished.

According to the embodiment described heretofore, if the number of virtual machines in the master mode detected to be in failure on a physical computer is less than the number of installed virtual machines, system switching (fail over) is conducted and then fail back is conducted every virtual machine. On the other hand, if the number of virtual machines in the master mode detected to be in failure on the physical computer is at least the number of installed virtual machines, system switching is conducted on all virtual machines. No matter whether a single virtual machine in the master mode fails or a plurality of virtual machines in the master mode fail, therefore, finally all virtual machines in one of physical computers operate in the master node and it becomes easy for the user to manage the operation mode of the physical computers. As a result, it becomes possible to conduct hardware and software maintenance on one physical computer while operating all virtual machines on the other physical computer in the master mode.

REFERENCE SIGNS LIST

1: Virtualization multiplex system
2: Terminal
3: External network
4: Internal network
100: Computer node
101: Memory
102: Processor
103: Storage device
104: External communication I/F
105: Inter-node communication I/F
200: VM
201: VM
211: AP
212: Multiplex control agent program
213: Guest OS
300: Multiplex control base program 301: Computer node structure management table
302: VM state management table
303: Resource management table
304: System switching control table
305: Computer node monitoring unit
400: Host OS
401: Virtualization program
402: Device control program
700: APdog

The invention claimed is:

1. A computer system comprising:
a plurality of computer nodes, each of the plurality of computer nodes comprising a plurality of virtual computers constituting a logical group based on software running on the virtual computers, and a control base unit controlling the plurality of virtual computers,
each virtual computer constituting a multiplexing group with another virtual computer operating on another computer node different from an own computer node on which the virtual computer is operating, with either one operating as a master virtual computer whereas the other operates as a slave virtual computer,
the control base unit managing whether each of the plurality of virtual computers in the own computer node, in which the control base unit is provided, operates as a master virtual computer or a slave virtual computer, and monitoring a state of each of the plurality of virtual computers, and
wherein upon detecting a failure of a virtual computer operating on the own computer node as a master virtual computer, the control base unit decides whether to also switch other virtual computers operating on the own computer node in the logical group along with the virtual computer in which the failure occurred from master virtual computers to slave virtual computers, and exercising control of switching the logical group in accordance with a result of the decision.

2. The computer system according to claim 1, wherein the control base unit decides whether to also switch other virtual computers operating on the own computer node in the logical group along with the virtual computer in which the failure occurred from master virtual computers to slave virtual computers, depending on a ratio of a number of virtual computers operating on the own computer node as master virtual computers to a number of virtual computers operating on the own computer node as slave virtual computers.

3. The computer system according to claim 2, wherein if the number of virtual computers operating on the own computer node as master virtual computers is less than half of a total number of virtual computers operating on the own computer node, the control base unit exercises control to also switch other virtual computers in the logical group operating on the own computer node as master virtual computers along with the virtual computer in which the failure occurred from master virtual computers to slave virtual computers.

4. The computer system according to claim 2, wherein
if the number of virtual computers operating on the own computer node as master virtual computers is at least half of a total number of virtual computers operating on the own computer node, the control base unit exercises control to switch the logical group of the virtual computer in which the failure occurred from master virtual computers to slave virtual computers, and
upon recovery from the failure, the control base unit exercise control to restore the logical group of the virtual computer in which the failure occurred from the slave virtual computers to the master virtual computers.

5. The computer system according to claim 1, wherein when switching one of the virtual computers operating on the own computer node from a master virtual computer to a slave virtual computer, the control base unit transmits a notice of a request of switching to a slave virtual computer to the one of the virtual computers, and to switch another one of the virtual computers that constitutes a multiplexing group with the one of the virtual computers from a slave virtual computer to a master virtual computer, the control base unit transmits a notice to another computer node on which the other one of the virtual computer operates.

6. The computer system according to claim 1, wherein the control base unit manages hardware resources used by respective virtual computers operating on the own computer node, and upon detecting a failure of a hardware resource shared by the logical group of virtual computers operating as master virtual computers, the control base unit exercises control to switch the logical group together from master virtual computers to slave virtual computers.

7. A method executed in a computer system comprising a plurality of computer nodes, each of the plurality of computer nodes comprising a plurality of virtual computers constituting a logical group based on software running on the virtual computers and a control base unit controlling the plurality of virtual computers,
each virtual computer constituting a multiplexing group with another virtual computer operating on another computer node different from an own computer node on which the virtual computer is operating, with either one operating as a master virtual computer whereas the other operates as a slave virtual computer, the method comprising:
managing, by the control base unit, as to whether each of the plurality of virtual computers in the own computer node, in which the control base unit is provided, operates as a master virtual computer or a slave virtual computer;
monitoring, by the control base unit, a state of each of the plurality of virtual computers;
upon detecting a failure of a virtual computer operating on the own computer node as a master virtual computer, deciding, by the control base unit, whether to also switch other virtual computers operating on the own computer node in the logical group along with the virtual computer in which the failure occurred from master virtual computers to slave virtual computers; and
exercising control of switching the logical group in accordance with a result of the decision.

8. The method according to claim 7, wherein the control base unit decides whether to also switch other virtual computers operating on the own computer node in the logical group along with the virtual computer in which the failure occurred from master virtual computers to slave virtual computers, depending on a ratio of a number of virtual computers operating on the own computer node as master virtual computers to a number of virtual computers operating on the own computer node as slave virtual computers.

9. The method according to claim 8, wherein if the number of virtual computers operating on the own computer node as master virtual computers is less than half of a total number of virtual computers operating on the own computer node, the control base unit exercises control to also switch other virtual computers in the logical group operating on the own computer node as master virtual computers along with the virtual computer in which the failure occurred from master virtual computers to slave virtual computers.

10. The method according to claim 8, wherein if the number of virtual computers operating on the own computer node as master virtual computers is at least half of a total number of virtual computers operating on the own computer node, the control base unit exercises control to switch the logical group of the virtual computer in which the failure occurred from master virtual computers to slave virtual computers, and upon recovery from the failure, the control base unit exercise control to restore the logical group of the virtual computer in which the failure occurred from the slave virtual computers to the master virtual computers.

11. The method according to claim 7, wherein when switching one of the virtual computers operating on the own computer node from a master virtual computer to a slave virtual computer, the control base unit transmits a notice of a request of switching to a slave virtual computer to the one of the virtual computers, and to switch another one of the virtual computers that constitutes a multiplexing group with the one of the virtual computers from a slave virtual computer to a master virtual computer, the control base unit transmits a notice to another computer node on which the other one of the virtual computers operates.

12. The method according to claim 7, wherein the control base unit manages hardware resources used by respective virtual computers operating on the own computer node, and upon detecting a failure of a hardware resource shared by the logical group operating as master virtual computers, the control base unit exercises control to switch the logical group together from master virtual computers to slave virtual computers.

* * * * *